United States Patent
Kobayashi et al.

[11] Patent Number: 5,936,792
[45] Date of Patent: Aug. 10, 1999

[54] POSITIONING ADAPTIVE CONTROL METHOD AND POSITIONING DEVICE AS WELL AS INFORMATION STORAGE DEVICE

[75] Inventors: Masahito Kobayashi; Takashi Yoshida, both of Ibaraki-ken; Takashi Yamaguchi, Tsuchiura, all of Japan

[73] Assignee: Hitachi, Ltd., Tokyo, Japan

[21] Appl. No.: 08/677,546

[22] Filed: Jul. 18, 1996

[30] Foreign Application Priority Data

Jul. 18, 1995 [JP] Japan ................................. 7-181257

[51] Int. Cl.⁶ .................................................. G11B 5/598
[52] U.S. Cl. ................................... 360/78.07; 360/78.04; 360/77.01
[58] Field of Search ........................ 360/75, 77.08, 360/78.07, 78.09

[56] References Cited

U.S. PATENT DOCUMENTS

| 4,697,127 | 9/1987 | Stich et al. ................ 360/78.09 X |
| 5,426,545 | 6/1995 | Sidman et al. ................ 360/78.09 |

FOREIGN PATENT DOCUMENTS 58-182169  10/1983  Japan .

OTHER PUBLICATIONS

Papers of the Society of Instruments and Control Engineers entitled "Head Positioning Control of a Hard Disk Drive Using H∞ Control Theory", vol. 29, No. 1, pp. 71/77 (1993).

Primary Examiner—Aristotelis M. Psitos
Assistant Examiner—K. Wong
Attorney, Agent, or Firm—Evenson, McKeown, Edwards & Lenahan, P.L.L.C.

[57] ABSTRACT

A positioning adaptive control method and positioning device which allow rapid positioning of a head by speed-controlling a seek operation in an information storage device such as a magnetic disk unit. The seek operation moves the head to a vicinity of a target track and a following operation causes the head to accurately follow a position on the target track when the head is positioned in the vicinity of the target track. These operations are controlled based on data recorded in sectors formed on a recording plane of a disk. A variable gain of an acceleration feed forward signal is controlled sequentially by an adaptive control rule so that a deviation signal between a target speed and an actual speed of the head is reduced when the speed of the head is shifted from an acceleration or constant speed state to a deceleration state under speed control. The variable gain of the acceleration feed forward is used per each sampling for the adaptive control rule and a square value of the speed deviation signal is minimized.

34 Claims, 20 Drawing Sheets

POSITIONING ADAPTIVE CONTROL METHOD AND POSITIONING DEVICE AS WELL AS INFORMATION STORAGE DEVICE

BACKGROUND AND SUMMARY OF THE INVENTION

Generally, a sector servo method, or a servo method conforming thereto, for positioning a data head sector based on servo data is used in information storage devices such as a magnetic disk unit to achieve high density recording. The servo data is stored in advance at the end of the sector formed on a data recording plane. The servo method is suitable for a seek operation for rapidly moving the head to a target track, and to a following operation for causing the head to follow the center of the target track with high precision.

In the seek operation, the speed of the head is controlled in accordance with a predetermined target speed curve in order to move the head to the vicinity of the target track. When the head reaches the vicinity of the track, the operation is switched to the following operation in order to control the head's position and to cause it to follow the center of the track. A target speed signal is calculated from the target speed curve based on the difference (remaining distance) between a current position and a target position of the head. A speed error signal, which is a deviation between the target speed signal and an actual speed signal of the head, is amplified and is applied as a feedback control input to a voice coil motor for driving the head.

Also, when the target speed curve is given in a ramped manner during deceleration, i.e., when decelerated at a constant acceleration, a speed deviation is produced in the above-mentioned feedback control. Two methods are contemplated for reducing the speed deviation. One method widens a control band of the speed loop and the other method reduces an inclination of the target speed curve. The former has a problem in that there is a limit in the width of the control band due to a mechanical resonance of a support mechanism system for supporting and driving the head, and the latter has a problem in that it is difficult to keep a head access time within a predetermined time.

A proposed control method of finding a target acceleration curve for advance use in the speed control by differentiating the target speed curve and a method of obtaining an acceleration feed forward signal from the target acceleration curve in order to apply it to a speed error signal has been described in Japanese Patent Laid-Open No. 58-182169 for example. Its purpose is to compensate the stability through the use of feedback control and to improve the response through the use of feed forward control. The known method allows the head to follow the target speed curve accurately without needing to widen the control band of the speed control loop nor reduce the inclination of the target speed curve. Thus, the known method causes less speed error in switching to the positional control and prevents an overshoot phenomenon in which the head movement exceeds a target track position or an undershoot phenomenon in which the head stops before reaching the target track position, as well as reducing the access time.

Further, it is possible to accelerate/decelerate the head to cause it to follow the center of the target track only by using the positional control system without controlling the seek operation and the following operation by separate control systems. This method eliminates the switching of the control systems and allows the head to be settled on the center of the target track smoothly and allows the access time to be reduced. An example thereof is described by Hirata et. al in "Head Positioning Control of Hard Disk Using H∞ Control Theory", Papers of the Society of Instrument and Control Engineers, Vol. 29, No. 1, pp. 71/77 (1993). In the paper, a compensation filter derived from the H∞ control theory is used as a feedback control compensator to suppress resonance/disturbance of the head supporting mechanism system. A smooth sinusoidal acceleration signal is input in feed forward control to move the head at high speed.

It is known to design a control system based on dynamic characteristics of an object to be controlled so that a given design specification is met. For example, a speed control system of a magnetic disk unit is designed so that zero-cross frequency in an open loop characteristic meets with the design specification by deciding a speed gain of a speed loop by using a loop gain of an object to be controlled and by deciding a loop gain of an acceleration feed forward compensator by using an inverse gain of the loop gain of the object to be controlled. The loop gain of the object to be controlled here means a loop gain from a control input to a speed signal of the head. The loop gain is given by an amplifier gain of an amplifier, a force constant of a voice coil motor, an equivalent mass of the head and a speed detection gain, etc. As methods for detecting the speed, there is known a method of calculating a position signal by backward differential or a method of calculating it by using a speed observer from a position signal and a current signal from an amplifier.

The loop gain of the object to be controlled varies depending on manufacturing allowances, operating conditions, operating environments and an elapsed change, etc. For example, the force constant of the voice coil motor changes depending on the track position where the head is located due to magnetic flux leakage from both ends of the voice coil. That is, a force gain is small at the inner and outer diameter sides of the disk, and is large at the center of the disk. A difference of these gains amounts to about 10%.

A position detection gain of the head depends on the manufacturing allowance of the head and the gain changes due to a dispersion of a core width of the head. That is, when the core width of the head is larger than a designed standard, both the read voltage and position detection gain become larger. By contrast, when the core width of the head is smaller than the designed standard, both the read voltage and position detection gain become smaller. A difference of these gains amounts to about 20% at the data head. A fluctuation of the speed detection gain of the head depends on the fluctuation of a detected gain of the position signal of the head, and is about the same with the detected gain of the position signal.

Mechanical characteristics of the voice coil motor and the electrical characteristics of a driving circuit, as well as others, also fluctuate as they are influenced by environmental factors such as the temperature and humidity within a unit. Further, when such a magnetic disk unit is used for a long period of time, the characteristics of the bearing supporting the head gradually changes due to abrasion and change in the oil characteristics. As a result, the characteristics of an object to be controlled become different from those when the unit is first shipped out.

That is, the characteristics of the entire control system deviate from the optimum point due to the dispersion of mechanical characteristics of the driving system for driving the head, the dispersion of electrical characteristics of the driving circuit and the dispersion of the detected gain of the head. These deviations prevent the performance of the rapid seek operation and the high precision following operation, thus degrading the performance of the unit. The dispersion of the response of the head may be suppressed more or less by performing the seek operation by using only the feedback control because the gain fluctuation of the object to be controlled is suppressed by the feedback characteristic.

For the case when the head is rapidly sought by using the feed forward control as described in Japanese Patent Laid-Open No. 58-182169 and in Papers of the Society of Instrument and Control Engineers, Vol. 29, No. 1, pp. 71/77 (1993) mentioned above, the dispersion of the gain of the object to be controlled turns out directly as a dispersion of the response of the head.

Static and dynamic external forces are applied to the head during the seek operation. A signal line for transmitting recording/reproduction signals of the head to a circuit board is provided by a cable composed of a copper foil pasted to a soft medium called an FPC (flexible printed circuit). The cable acts as a spring force, i.e. a force disturbance, to the head supporting mechanism. Due to the external force, the head speed signal deviates from a target speed signal during the seek operation using speed control. On the other hand, the head position deviates from a target position during the seek operation using position control. While the head turns about an axis of rotation of the head supporting mechanism section, a moment force is generated at the supporting mechanism section during the seek operation. As a result, the base supporting the supporting mechanism section vibrates. Due to the vibration of the base, a disk mounted on the base vibrates, thus causing a relative position error between the disk and the head as a positional disturbance to the head position.

Accordingly, it is an object of the present invention to eliminate the above-mentioned problems and to significantly increase the recording density of the disk unit as well as to rapidly position the head with high precision. In practice, it is an object of the present invention to provide an adaptive control system and an information storage device equipped therewith which can automatically correct the deviation of the control characteristics from the optimum point due to the dispersion of parts composing the positioning mechanism system and the electrical system, while always having good head positioning characteristics.

It is another object of the present invention to provide an adaptive control system and an information storage device equipped therewith which controls an acceleration feed forward gain in real-time by an adaptive controller in order to reduce the dispersion of the response of the position during the seek operation in which speed control is applied.

It is still another object of the present invention to provide an adaptive control system and an information storage device equipped therewith which controls an acceleration feed forward gain in real-time by an adaptive controller in order to reduce the dispersion of the response of the position during the seek operation in which position control is applied.

It is a further object of the present invention to provide a real-time adaptive control system and an information storage device equipped therewith which requires no training signal when a gain fluctuation of an object to be controlled is estimated.

In order to achieve the aforementioned objects, a first aspect of the present invention provides:

1) in a positioning adaptive control method for positioning a head for reading/writing information either recorded on a disk or to be recorded on the disk to a predetermined position of a target track by using a seek operation for positioning the head to a track on the disk and a following operation for positioning the head while on the track, a control system related to the seek operation is controlled sequentially during the seek operation so that the head may be positioned to the target track rapidly with high precision during the following operation which follows the seek operation.

A second aspect of the present invention for achieving the aforementioned objects is that a feed forward control input is controlled sequentially in a positioning adaptive control method for moving the head to a target position by adding a feedback control input obtained based on a speed error between a target speed and an actual speed of the head and a feed forward control input obtained based on a target acceleration. The second aspect has options as shown in items 2) through 6) below. It is noted that the feedback control input and the feed forward control input are used with any of the options.

2) The feed forward control input is controlled sequentially so that the speed error is reduced during head movement.

3) The feed forward control input is controlled sequentially so that a square of the speed error is minimized when the speed of the head starts to decelerate.

4) The feed forward control input is controlled sequentially by multiplying the feed forward control input with a control gain $\theta(k)$ which is expressed by $\theta(k+1)=\theta(k)+\eta \cdot uv(k) \cdot sa(k)$, wherein the feedback control input is denoted as $uv(k)$, the feed forward control input as $sa(k)$ and a learning gain as $\eta$.

5) The feed forward control input is controlled sequentially so that a value obtained when square values of the speed error are added sequentially is minimized when the speed of the head starts to decelerate.

6) The feed forward control input is controlled sequentially by multiplying the feed forward control input with a control gain $\theta(k)$ which is expressed by $\theta(k+1)=\theta(k)+\gamma(k+1) \cdot uv(k) \cdot sa(k)$, wherein the feedback control input is denoted as $uv(k)$ the feed forward control input as $sa(k)$ and a learning gain as $\gamma(k)$.

A third aspect of the present invention for achieving the aforementioned objects provides a feed forward control input which is controlled sequentially in a positioning adaptive control method for moving a head to a target position by adding a feedback control input obtained based on a position error between a target position and an actual position of the head and the feed forward control input obtained based on a target acceleration. Similarly to the second aspect, there are options also for this aspect as shown in items 7) through 11) below. The feedback control input and the feed forward control input are used with any option.

7) The feed forward control input is controlled sequentially so that the position error is reduced during head movement.

8) The feed forward control input is controlled sequentially so that a square of the position error is minimized when the head starts to move.

9) The feed forward control input is controlled sequentially by multiplying the feed forward control input with a control gain $\theta(k)$ which is updated sequentially by $\theta(k+1)=\theta(k)+\eta \cdot uv(k) \cdot sa(k)$, wherein the feedback control input is denoted as $uv(k)$, the feed forward control input as $ua(k)$, a learning gain as $\eta$ and the feed forward control input before a gain is applied as $sa(k)$.

10) The feed forward control input ua(k) is controlled sequentially so that a value obtained when square values of the position error are added sequentially is minimized when the head starts to move.

11) The feed forward control input ua(k) is controlled sequentially by multiplying the feed forward control input sa(k) with a control gain θ(k) which is updated sequentially by θ(k+1)=θ(k)+γ(k+1)·uv(k)·sa(k), wherein the feedback control input is denoted as uv(k), the feed forward control input as ua (k), a learning gain as γ(k) and the feed forward control input before the gain is applied as sa(k).

A fourth aspect of the present invention for achieving the aforementioned objects is that feed forward control inputs are controlled sequentially in a positioning adaptive control method for moving the head to a target position by adding a feedback control input obtained based on a speed error between a target speed and an actual speed of the head or a position error between a target position and an actual position of the head, a first feed forward control input obtained based on a target acceleration and a second feed forward control input obtained based on an acceleration disturbance signal. The fourth aspect also has options as shown in items 12) and 13) below, and the feedback control input, the first feed forward control input and the second feed forward control input are used in any of the options.

12) The first and second feed forward control inputs are controlled sequentially so that the speed error is reduced during head movement.

13) The first and second feed forward control inputs are controlled sequentially so that the position error is reduced during head movement.

A fifth aspect of the present invention for achieving the aforementioned objects is that a feed forward control input is controlled sequentially in a positioning adaptive control method for generating a control input for moving the head to a target position by adding a feedback control input obtained or a position error between a target position and a head position based on a speed error between a target speed and a head speed and the feed forward control input obtained based on a target acceleration, and has the options as shown in items 14) through 17) below. A variable gain is provided at an arbitrary place from the control input for moving the head to the target position to the speed signal of the head, and the feedback control input and the feed forward control input are used in any of the options.

14) The feed forward control input is controlled sequentially so that the speed error is reduced even if the variable gain is increased or reduced during head movement to immediately reduce the speed error which has been increased due to a gain change of the variable gain.

15) The feed forward control input is controlled sequentially so that the speed error is reduced even if the variable gain is increased or reduced in advance in order to immediately return the head speed signal which has been fluctuating due to the gain change of the variable gain to the state before the gain change of the variable gain.

16) The feed forward control input is controlled sequentially so that the position error is reduced even if the variable gain is increased or reduced during head movement in order to immediately reduce the position error which has been increased due to the gain change of the variable gain.

17) The feed forward control input is controlled sequentially so that the position error is reduced even if the variable gain is increased or reduced in advance in order to immediately return the head position signal which has been fluctuating due to the gain change of the variable gain to the state before the gain change of the variable gain.

It is noted that in items 4), 6), 9) and 11) described above, an initial value of the control gain θ(k) may be set at θ(0)=1.0 and, again in items 4), 6), 9) and 11), a value of a final control gain controlled during the previous head movement may be used as an initial value of the control gain θ(k).

Signals handled in each positioning adaptive control method described above may be either digital signals or analog signals.

In items 1), 2), 3), 5), 7), 8), 10) and 12) through 17) discussed above, the sequential control may be carried out in synchronism with time intervals for reading position data in a sector servo.

A sixth aspect of the present invention for achieving the aforementioned objects provides:

18) a positioning adaptive control device of an information storage device comprising a recording medium in which position data is recorded in advance; a head for reading the position data; a position signal computing element for generating a position signal from the position data reproduced by the head; a speed signal computing element for generating a speed signal of the head based on the position signal; a target acceleration generator for generating a target acceleration signal based on a remaining distance between a target position and a current position of the head; a target speed generator for generating a target speed signal based on the remaining distance; a speed error amplifier for generating a feedback control input signal by amplifying a speed error signal of a deviation between the target speed signal and the head speed signal; and a feed forward controller for generating a feed forward control input signal by multiplying the target acceleration signal with a controllable variable gain. The head is moved to the target position by a control input signal obtained by adding the feedback control input signal and the feed forward control input signal. The control device further comprises an adaptive controller for sequentially controlling a variable gain of the controllable target acceleration signal so that the speed error signal is minimized.

19) In item 18), the adaptive controller may control the variable gain of the controllable target acceleration signal sequentially based on a value in which the speed error signal, the target acceleration signal and a predetermined learning gain are multiplied so that a square of the speed error signal is minimized.

20) In item 18), the adaptive controller may control the variable gain of the controllable target acceleration signal sequentially based on the speed error signal, the target acceleration signal and a predetermined learning gain so that a value in which squares of the speed error signal are added sequentially is minimized.

A seventh aspect of the present invention for achieving the aforementioned objects provides:

21) a positioning adaptive control device of an information storage device comprising a recording medium in which position data is recorded in advance; a head for reading the position data; a position signal computing element for generating a position signal from the position data reproduced by the head; a target acceleration generator for generating a target acceleration signal; a position controller for generating a feedback control input signal by filtering a position error signal of a deviation between a target position signal and the position signal; a feed forward controller for generating a feed forward control input signal by multiplying the target acceleration signal with a controllable variable gain. The head is moved to the target position by a control input signal obtained by adding the feedback control input signal and the feed forward control input signal. The control device further comprises an adaptive controller for sequentially controlling a variable gain of the controllable target acceleration signal so that the position error signal is minimized.

22) In item 21), the adaptive controller may control the variable gain of the controllable target acceleration signal sequentially based on a value in which the position error signal, the target acceleration signal and a predetermined learning gain are multiplied so that a square of the position error signal is minimized.

23) In item 21), the adaptive controller may control the variable gain of the controllable target acceleration signal sequentially based on the position error signal, the target acceleration signal and a predetermined learning gain so that a sum of squares of the position error signal is minimized.

An eighth aspect of the present invention for achieving the aforementioned object provides:

24) a positioning adaptive control device of an information storage device comprising a recording medium in which position data is recorded in advance; a head for reading the position data; a position signal computing element for generating a position signal from the position data reproduced by the head; a speed signal computing element for generating a speed signal of the head based on the position signal; a target acceleration generator for generating a target acceleration signal based on a remaining distance between a target position and a current position of the head; a target speed generator for generating a target speed signal based on the remaining distance; a speed error amplifier for generating a feedback control input signal by amplifying a speed error signal for a deviation between the target speed signal and the head speed signal: and a feed forward controller for generating a first feed forward control input signal in which an acceleration disturbance signal is multiplied with a controllable first variable gain, a second feed forward control input signal in which the target acceleration signal is multiplied with a controllable second variable gain and a feed forward control input signal obtained by adding the first feed forward control input signal and the second feed forward control input signal. The head is moved to the target position by a control input signal obtained by adding the feedback control input signal and the feed forward control input signal. The control device further comprises an adaptive controller for sequentially controlling a first variable gain of the controllable acceleration disturbance signal and a second variable gain of the controllable target acceleration signal so that the speed error signal is minimized.

A ninth aspect of the present invention for achieving the aforementioned objects provides:

25) a positioning adaptive control device of an information storage device comprising a recording medium in which position data is recorded in advance; a head for reading the position data; a position signal computing element for generating a position signal from the position data reproduced by the head; a target acceleration generator for generating a target acceleration signal; a position controller for generating a feedback control input signal by filtering a position error signal for a deviation between a target position signal and the position signal; a feed forward controller for generating a first feed forward control input signal in which an acceleration disturbance signal is multiplied with a controllable first variable gain, a second feed forward control input signal in which the target acceleration signal is multiplied with a controllable second variable gain, and a feed forward control input signal obtained by adding the first feed forward control input signal and the second feed forward control input signal. The head is moved to the target position by a control input signal obtained by adding the feedback control input signal and the feed forward control input signal. The control device further comprises an adaptive controller for sequentially controlling a first variable gain of the controllable acceleration disturbance signal and a second variable gain of the controllable target acceleration signal that the position error signal is minimized.

26) In items 18), 21), 24) and 25) above, the sequential control is preferably carried out in synchronism with time intervals for reading the position data in the sector servo.

A tenth aspect of the present invention for achieving the aforementioned objects provides an information storage device comprising a recording medium in which position data is recorded, a head for reading the position data and a positioning adaptive control device for positioning the head to a track on the recording medium. The information storage device is equipped with the positioning adaptive control device comprising components in any one of the items 18) through 26) discussed above.

According to the present invention, the acceleration feed forward signal is controlled in real-time during deceleration so that the speed error to a target speed is reduced when the head, whose speed is controlled, is shifted from an acceleration state or a constant speed state to a deceleration state in the positioning control system in which the seek operation is controlled by the speed control and the following operation is controlled by the position control. Thereby, the speed error caused by a fluctuation of the gain of an object to be controlled and/or disturbance may be minimized. Further, when the control is switched from the speed control to the position control in the vicinity of a target track, dispersion of responses of the head position and head speed after the switch may be fully suppressed, thus giving a favorable settlement response and an access time may be shortened.

The positioning may always be completed rapidly and with high precision by performing the sequential control described above during the seek operation and by performing the seek operation and the following operation ensuing thereto regardless of the fluctuation of gain of the object to be controlled.

According to the present invention, in a positioning control system in which the seek operation and the following operation are controlled using only the position control, the acceleration feed forward signal is controlled in real-time so that a position error with respect to a target position is reduced from the start of the seek operation. Thereby, the position error caused by a fluctuation of a gain of an object to be controlled and/or a disturbance may be minimized. Then, a favorable settlement response is given when the head reaches the target track and the head access time may be shortened.

According to the present invention, the previously used training signal becomes unnecessary. Further, because the acceleration feed forward signal is controlled in real-time during the seek operation, the head can follow a target orbit with high precision. Accordingly, the target orbit which has been loosely set in the past may be set more sharply and the access time may be shortened.

The specific nature of the invention, as well as other objects, uses and advantages thereof, will be clearly apparent from the description and from the accompanying drawings.

DETAILED DESCRIPTION OF THE DRAWINGS

Preferred embodiments of the present invention will be explained below in detail with reference to the drawings.

Figure 1:
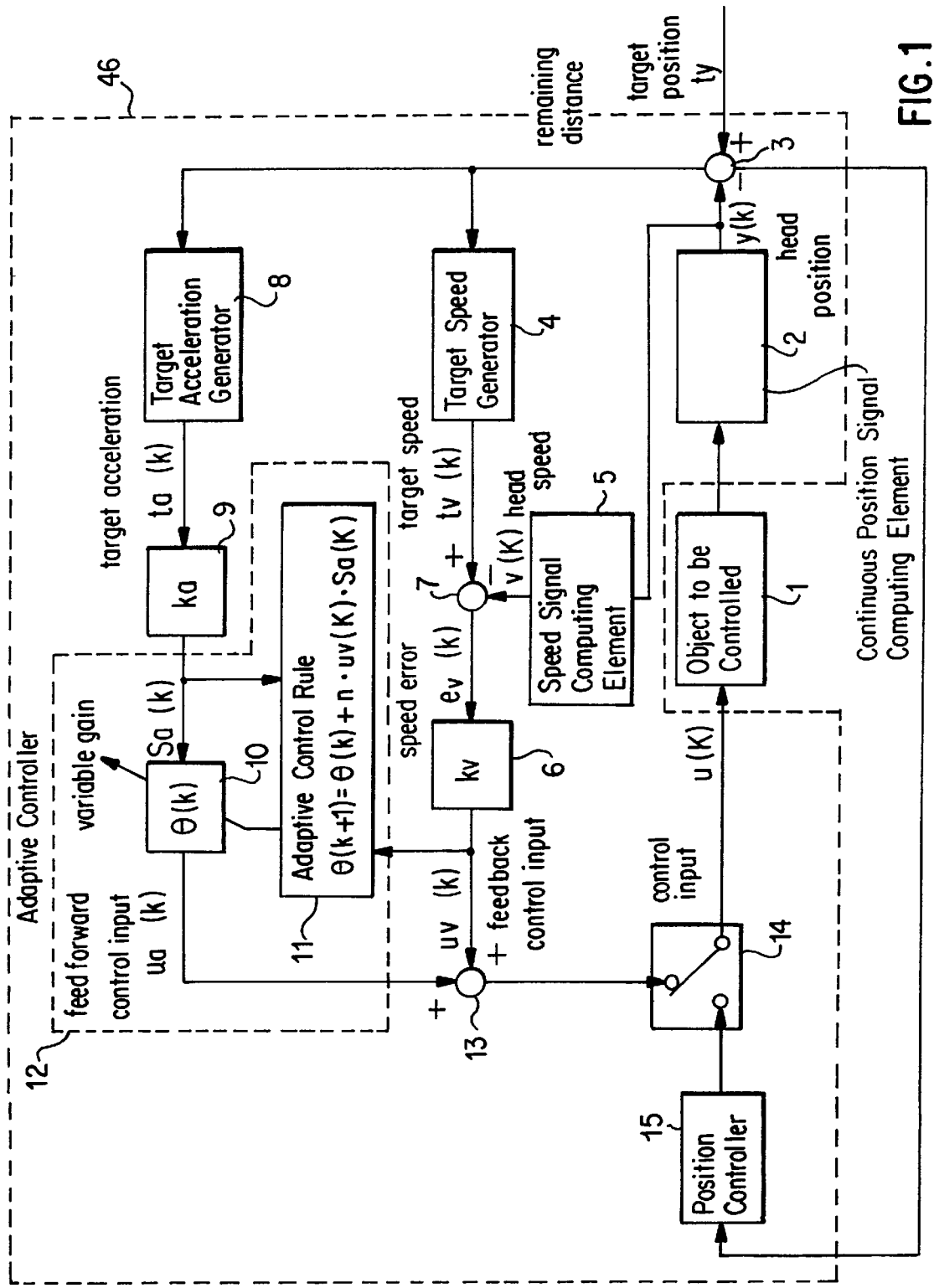
FIG. 1 is a block diagram of a positioning adaptive control system according to one preferred embodiment of the present invention.

FIG. 1 is a block diagram showing a positioning adaptive control system 46 for a magnetic disk unit according to one embodiment of the present invention. An object to be controlled 1 is a head driving system of the magnetic disk unit and comprises a power amplifier, a voice coil motor, a head supporting mechanism, a position signal demodulating system, as well as other components. The actual structure of the object to be controlled will be explained later with reference to FIG. 3. In the present embodiment, the head is moved to a target track by first moving it into the vicinity of the target track using a speed control system and then by switching the control system to a position control system with a switch 14 when the head is in the vicinity of the target track.

In the magnetic disk unit, two phases of position signals are adopted. A demodulation circuit demodulates servo data recorded at the head of a sector to generate the two phases of triangular discontinuous position signals whose phases are shifted by 90° from each other. The center of each track is represented by a zero-cross position of the position signal. A continuous position signal computing element 2 cuts out linear portions from the two phases of position signals to generate a continuous position signal. The continuous position signal shall be called a head position signal and is represented by y(k), wherein k is a number of steps from a seek starting time.

A head speed signal v(k) is calculated from the head position signal y(k) by means of a speed signal computing element 5 using a backward differential or the like. A target speed generator 4 refers to a table of correspondence stored in advance in a ROM (Read Only Memory) to generate a target speed signal tv(k) based on a remaining distance (y(k)−ty) generated by an adder 3 between the current head position y(k) and a target position ty. Similarly, a target acceleration generator 8 refers to a table or correspondence stored in advance in a ROM to generate a target acceleration signal ta(k) during deceleration of the speed control based on the remaining distance (y(k)−ty) between the current head position y(k) and the target position ty.

A deviation between the target speed signal tv(k) and the head speed signal v(k) generated by an adder 7 is referred to as a speed error signal and is represented as ev(k). A speed gain kv 6 of a speed loop is decided based on a loop gain of the object to be controlled 1 so that a zero-crossing frequency of an open loop of the speed control system containing the object to be controlled 1 becomes a set value. A feedback control input signal uv(k), in which the speed error signal tv(k) is multiplied by the speed gain kv, is used as a feedback control signal.

Hitherto, a feed forward acceleration control signal sa(k), in which the target acceleration signal ta(k) is multiplied by the acceleration gain ka, has been used as a feed forward control signal. Here, an acceleration gain 9 is determined as follows. When the gain from a control input of the object to be controlled 1 to a head acceleration is km, the acceleration gain ka should be set as an inverse gain of km. However, because it is difficult to find km accurately, the acceleration gain ka is set as the inverse gain of a nominal gain kmh, i.e. 1/kmh, where kmh is a nominal gain as opposed to the actual gain km. The control input u(k) to the object to be controlled 1 is a signal in which the feedback speed control input uv(k) and the feed forward acceleration control signal sa(k) are added by an adder 13.

Thereby, in an ideal condition in which there is no fluctuation of the gain of the object to be controlled nor any disturbance, kmh=km, a deviation of the stationary speed as against a target speed may be zeroed theoretically. However, when the gain of the object to be controlled 1 fluctuates, i.e. when kmh≠km, then an acceleration of the head deviates from the target acceleration, thus causing a speed error. Thus, the head settles less when the speed control system is switched to the position control system and the access time is prolonged.

In that event, the present embodiment takes in a signal in which the target acceleration signal ta(k) is multiplied by the acceleration gain ka and a signal in which the speed error signal ev(k) is multiplied with the speed gain kv. An adaptive controller 12 for sequentially controlling a variable gain θ(k) of the feed forward control signal per each sampling is then provided so that a square of the speed error signal ev(k)² is minimized during the deceleration of the seek operation.

A feed forward control input signal ua(k) results from the signal sa(k), obtained by multiplying the target acceleration speed ta(k) with the acceleration gain ka, multiplied with a gain θ(k) of a variable gain 10. When the square of the speed error signal ev(k)² becomes zero, the head moves by a command from only the acceleration feed forward signal, and the loop gain of the feed forward control signal θ(k)·ka (=θ(k)/kmh) becomes equal to the inverse loop gain of the object to be controlled, i.e. 1/km.

That is, the adaptive controller 12 estimates the loop gain km of the object to be controlled 1. Further, because the variable gain 10 of the acceleration feed forward is controlled so that the square of the speed error signal ev(k)² is minimized, the target speed coincides with the head speed and the seek operation can be shifted smoothly to the following operation. Still further, no training signal needs to be input to a control loop in order to control the variable gain 10.

When the head reaches the vicinity of the target track, the switch 14 is changed over to shift to the feedback control using a position controller 15. Thereby, it becomes possible to follow the target position ty with high precision. The position controller 15 can be, for example, a lead/lag (phase lead/phase lag) compensator.

A method for controlling the gain θ(k) of the variable gain 10 of the acceleration feed forward operation in the adaptive controller 12 will be explained below. An evaluation function E(k) is introduced to mathematically minimize the square of the speed error signal ev(k)². The evaluation function E(k) is expressed by the following equation considering a relationship of uv(k)=kv·ev(k). That is, the feedback control input uv(k) is minimized to minimize the speed error ev(k).

$$E(k) = \frac{1}{2}u_v(k)^2 = \frac{1}{2}(u(k) - u_a(k))^2 \quad (1)$$

An adaptive control rule 11 shown in the following equation (2) is applied to control the acceleration feed forward variable gain θ(k) in real-time by using a gradient method so that the evaluation function E(k) is minimized. The variable gain is not controlled when the head is accelerated.

$$\theta(k+1) = \theta(k) - \eta\frac{\partial E(k)}{\partial \theta(k)} \quad (2)$$

$$= \theta(k) - \eta\frac{\partial E(k)}{\partial u_a(k)} \cdot \frac{\partial u_a(k)}{\partial \theta(k)} \quad (3)$$

$$= \theta(k) + \eta \cdot (u(k) - u_a(k)) \cdot s_a(k) \quad (4)$$

$$= \theta(k) + \eta \cdot u_v(k) \cdot s_a(k) \quad (5)$$

Here, η is a learning constant which decides the speed of convergence of the variable gain θ(k).

An initial value θ(0) of the variable gain will be set here as θ(0)=1.0 so that the present embodiment can be readily understood. It is noted that the variable gain θ(k) remains as 1.0 when θ(0)=1.0 is not updated, and it also means that it is the same with the prior art control method.

Although θ(0)=1.0 in the present embodiment, a value of a final variable gain controlled during the previous seek operation may be set as the initial value of the present variable gain. The equation (3) may be derived from the equation (2) by a rule of connection of differential. The equation (4) is derived by partially differentiating both sides of the relational equation ua(k)=θ(k)·s_a(k) by θ(k). The equation (5) is used when the variable gain is updated by applying the rule of gradient.

A theoretical value of the learning gain η0 is a small value that satisfies the following equation (6);

$$0 < \eta < \frac{2}{s_a(k)^2} \quad (6)$$

The target acceleration signal ta(k) input during deceleration is always a negative value and $s_a(k)^2 \neq 0$. Accordingly, the learning gain η which satisfies equation (6) is obtained and the following equation (7) is satisfied:

$$\lim_{k \to \infty} u_v(k) = 0 \quad (7)$$

The speed error is converged to zero by this method.

A concept for updating the gain θ(k) of the variable gain 10 will be explained below using the gradient rule applied in equation (2) with reference to FIG. 2. In the figure, the horizontal axis represents the θ(k) component of the variable gain in the acceleration feed forward signal and the vertical axis represents the evaluation function given by the equation (1).

A value of the evaluation function for the gain θ(k) of the variable gain 10 in the k-th step is assumed to be E(k). Because the evaluation function curve has a positive gradient (inclination) at point A, the value of the evaluation function is reduced if the gain θ(k) of the variable gainer 10 is corrected in the minus direction. In equation (2), the gain θ(k) of the variable gain 10 is corrected in the direction inverse from the sign of the gradient by finding the gradient from computation of ∂E(k)/∂θ(k) at point A on the error curve and by multiplying the gradient with the learning gain η. A value at that time is assumed to be θ(k+1). The point is shifted to point B on the error curve in step (k+1). The greater the gradient as opposed to the error curve, the greater is the updated amount of the variable gain. The smaller the gradient as opposed to the error curve, the smaller is the updated amount of the variable gain. When the above operation is executed sequentially, the gradient becomes zero in the end and reaches point C. The point C is a point where the evaluation function is minimized.

It is noted that the timing for sequentially executing the above-mentioned operation may be synchronized with the timing for reading position data in the sector servo. Update intervals in equation (2) may be set as an integer number of position data reading intervals, so that it need not always be updated every time the position data is read.

Figure 3:
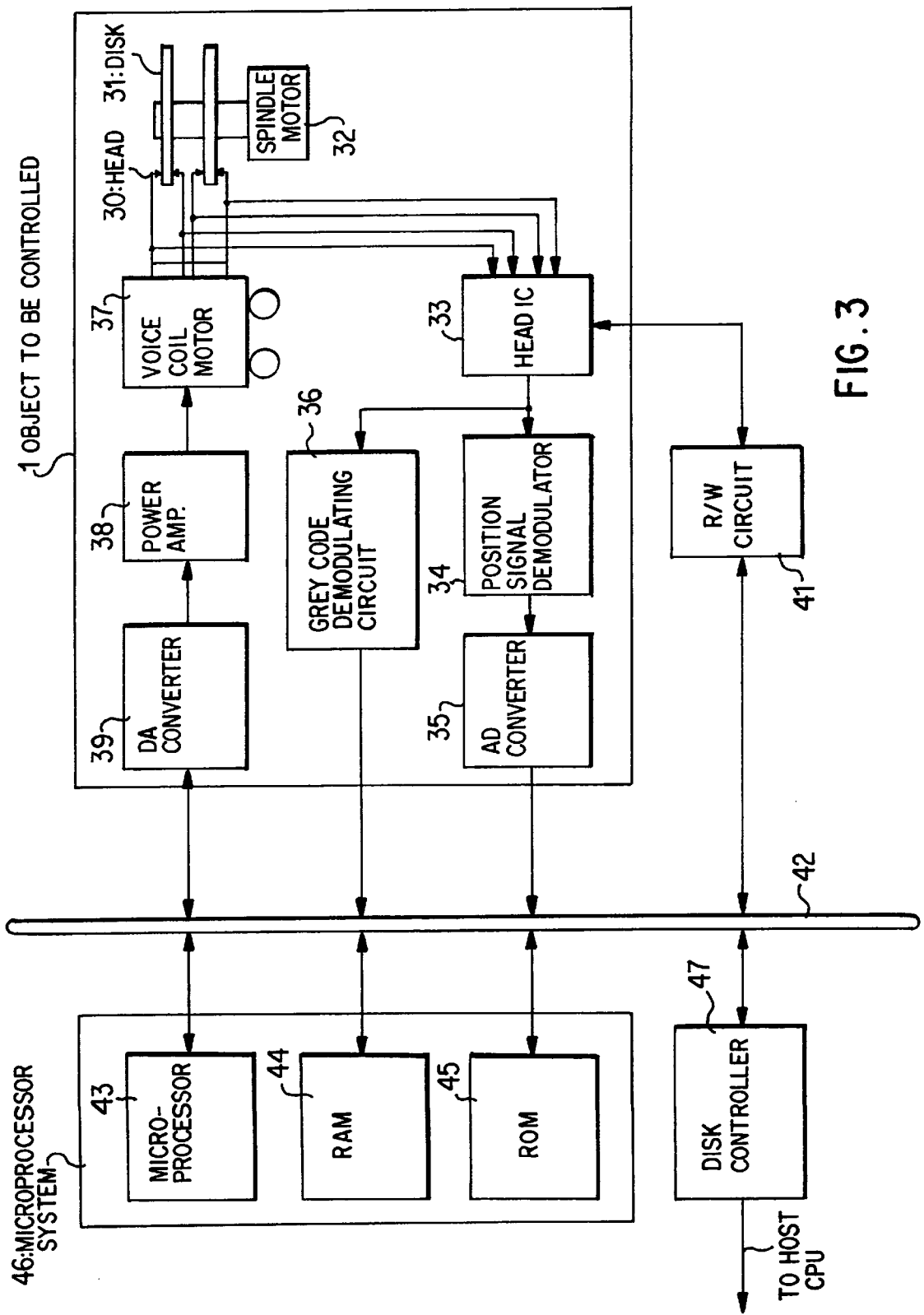
FIG. 3 is a schematic block diagram of a magnetic disk unit according to one embodiment of the present invention.

FIG. 3 is a schematic block diagram of an adaptive control device used in the inventive magnetic disk unit. In the magnetic disk unit, a disk contorller 47 instructs a microprocessor 43 so as to move a head 30 to a target track when it receives a recording or reproduction command from a host CPU. A magnetic disk 31 is mounted on an axis of rotation driven by a spindle motor 32 and the head 30 floats on the surface of the disk 31 with a small gap. The head 30 is attached to a head supporting mechanism which is, in turn, fixed to a voice coil motor 37. The head 30 moves in the direction from the outer diameter side to the inner diameter side, or in the reverse direction thereof, in accordance with a movement of the voice coil motor 37 in order to read/write information recorded on a track of the disk 31. The head 30 transmits information between the disk controller 47 via a head IC 33 and a R/W (Read/Write) circuit 41.

In the magnetic disk unit, servo data is recorded at the head of each sector of all of the tracks on the disk 31 in order to record information with high density. A sector servo method for positioning the head at a predetermined position by reading such servo data by the head 30 is adopted. Accordingly, all of the heads are data heads. Servo data obtained from an individual data head is amplified by the head IC 33 and is converted into a position signal by a position signal demodulating circuit 34. The position signal is converted into a digital signal by an AD (analog-digital) converter 35. The servo data includes a section where a track number is recorded and it is demodulated by a grey code demodulator 36. The position signal and the track number are input into the microprocessor 43 via a bus line 42.

The microprocessor 43 within a microprocessor system 46 (which performs the adaptive control described which respect to FIG. 1) is connected with a RAM (Random Access Memory) 44 and a ROM (Read Only Memory) 45 via the bus line 42. Programs used for the speed control system, the position control system and the adaptive controller 12 are stored in the ROM 45. The variable gain and the like are stored temporarily ln the RAM 44. The microprocessor 43 computes the control input u(k). Here, the object to be controlled 1 comprises a DA converter 38, a power amplifier 38, the voice coil motor 37, the head supporting mechanism system, a detected gain of the head position signal and the AD converter 35.

Figure 4:
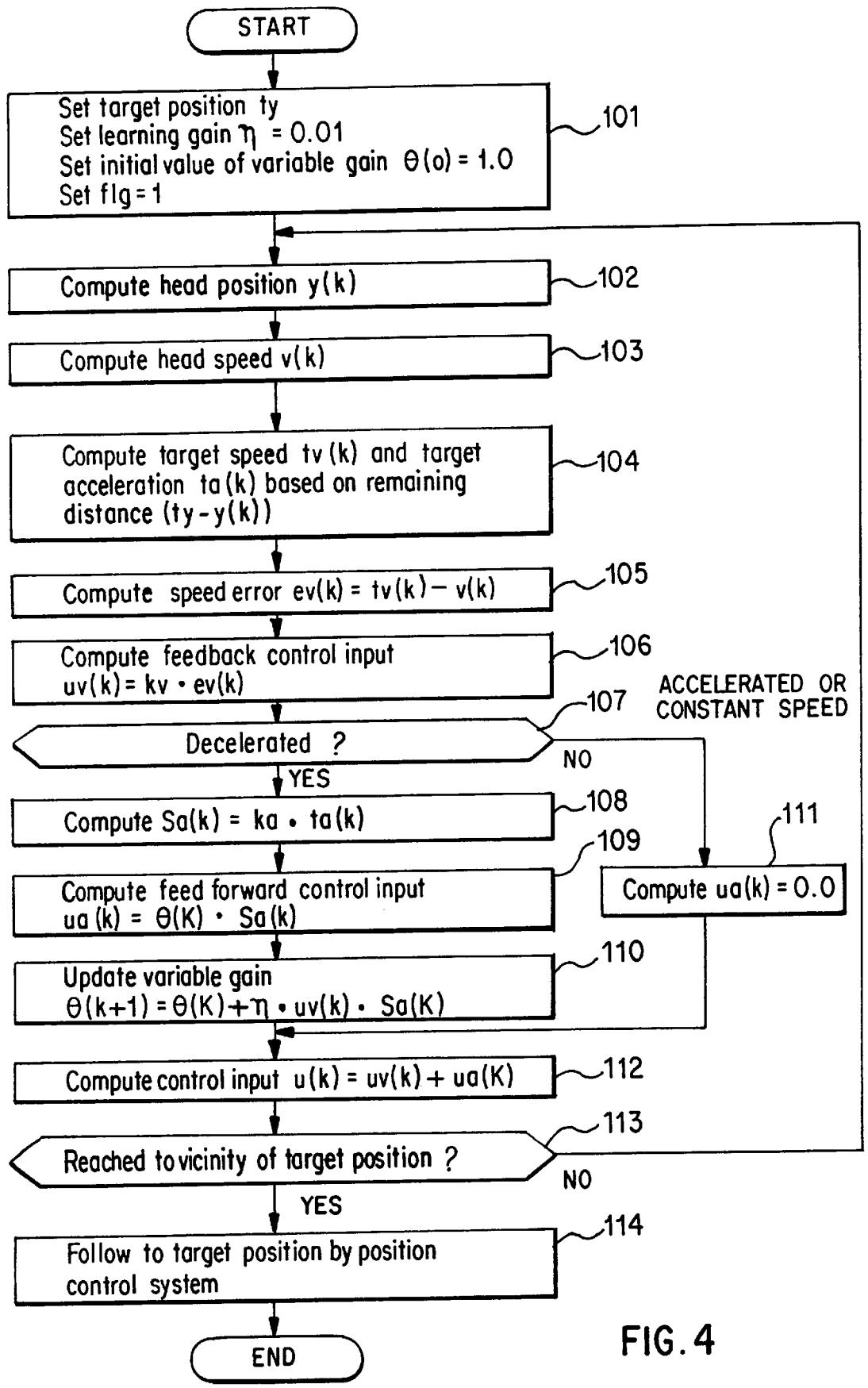
FIG. 4 is a flowchart showing the seek operation procedure according to one embodiment of the present invention.

FIG. 4 is a flowchart for explaining a procedure for executing the seek operation according to one embodiment of the present invention. A target position ty, the learning gain $\eta$ in the equation (5), and the initial value $\theta(0)$ of the variable gain 10 of acceleration forward operation are set at first in Step 101. Here, $\eta$ is set at 0.01 and $\theta(0)$ is set at 1.0. The head position y(k) is computed by the continuous signal position computing element 2 in Step 102 and the head speed v(k) is computed from the head position y(k) by means of the backward differential method or the like in Step 103. The target speed generator 4 generates the target speed tv(k) by referring to a target speed table stored in advance in the ROM 45 based on a difference (remaining distance) between the target position and an actual position of the head. A target acceleration generator 8 also generates a target acceleration ta(k) similarly based on the remaining distance in Step 104.

In Step 105, the speed error ev(k) is computed from the deviation between the target speed tv(k) and the head speed v(k) and in Step 106, this speed error ev(k) is multiplied with a gain value kv of the speed gain 6 of the speed loop in order to compute the feedback control input signal uv(k).

Next, from the condition of the speed error ev(k) in Step 107, it is determined whether the head is being decelerated, accelerated or at a constant speed. When the head is being accelerated or is at constant speed, the value ua(k) of the feed forward control input is set at ua(k)=0.0 in Step 111. When the head is being decelerated, the feed forward acceleration control signal sa(k) is computed by multiplying the target acceleration ta(k) with the gain ka of an acceleration feed forward acceleration gain 9 in Step 108.

Figure 4A:
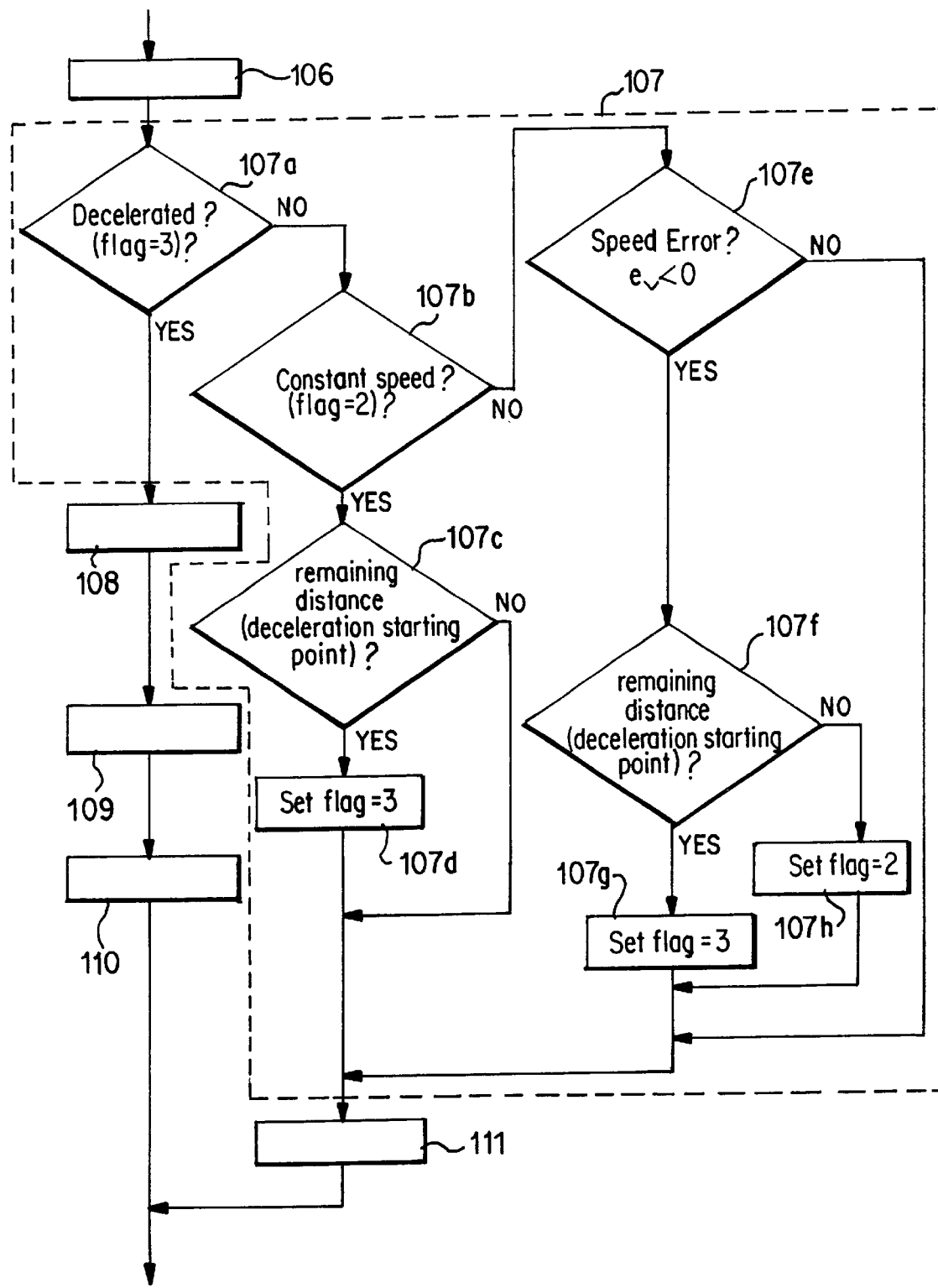
FIG. 4a is a flowchart illustrating Step 107 in FIG. 4.

Referring to FIG. 4a, Step 107 of FIG. 4 is explained. The state of seek motion of the head, i.e., decelerating, accelerating, or constant speed, is judged on the basis of a seek flag. A seek flag equalling 1 indicates that the head is in an acceleration state. A seek flag equalling 2 indicates that the head is in a constant speed state. A seek flag equalling 3 indicates that the head is in a decelerating state. Before beginning any seek motion, the seek flag is set equal to 1, i.e., it is set for an acceleration state. In Step 107a, the seek motion is determined based on whether the head is in a decelerating state, i.e., the flag equals 3. If the flag does equal 3, then a decelerating state is determined and the process continues at Step 108. However, if the head is not determined to be in a decelerating state, then it is determined whether the head is in a constant speed state, i.e., flag equalling 2, or in an acceleration state. In Step 107b, if the head is not in a constant speed state, then Step 107e is executed. In Step 107e, the sign of a speed error is compared. If the sign is positive, then the process proceeds to Step 111 meaning that an acceleration state was present. If however, the speed error $e_v$ becomes negative, namely the head speed approaches and reaches the target speed, then Step 107 is executed. In Step 107, the remaining distance signifying a difference between the target position and the present location of the head is compared to determine whether it is greater than a deceleration starting point in a target speed curve which denotes a point changing from the constant speed state to the decelerating state. If the remaining distance is greater than the decelerating starting point, then the flag is set to equal 2, i.e., the constant speed state (Step 107h). Otherwise, the seek motion is assumed to be in a decelerating state and the flag is set to 3 (Step 107g).

If the seek motion is determined to be in the constant speed state, then the remaining distance is compared with the deceleration starting point in the target speed curve (Step 107c). If the remaining distance is greater than the deceleration starting point, then the seek motion remains the constant speed motion. Otherwise, the flag is set to equal 3 (Step 107d), in which case, Step 111 is then executed.

Figure 4B:
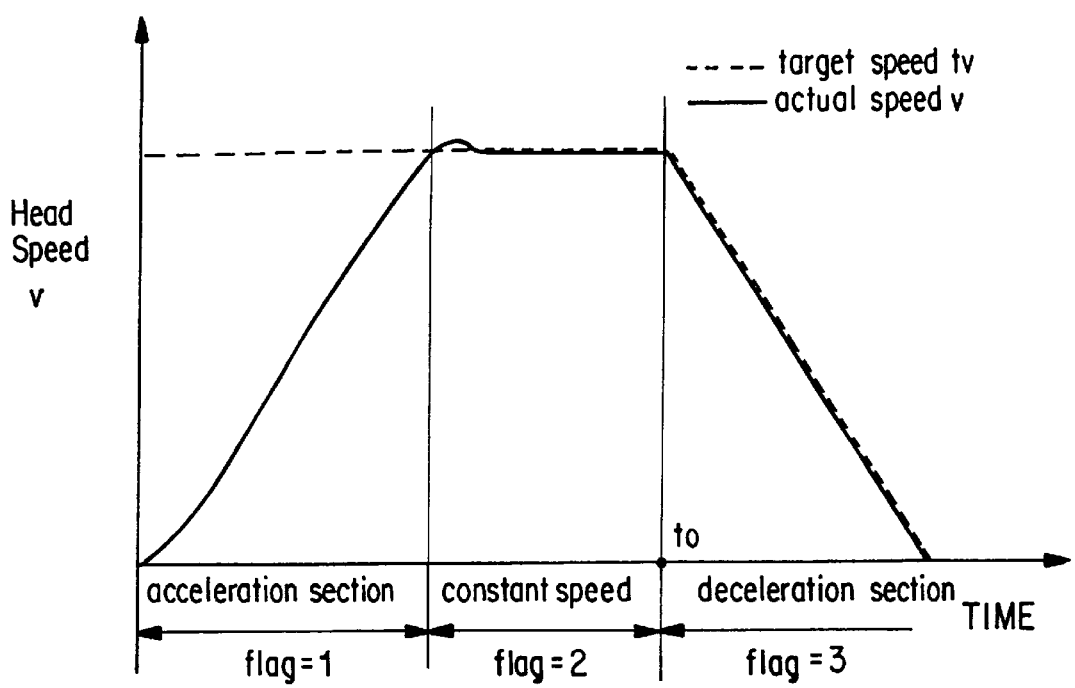
FIGS. 4b and 4c are graphical charts illustrating the head speed change from acceleration motion to deceleration motion with and without a constant speed motion, respectively.

A response curve for the head speed is shown in FIG. 4b. There, the speed of the head v changes from an acceleration motion in the acceleration section to a deceleration motion via the constant speed motion.

Figure 4C:
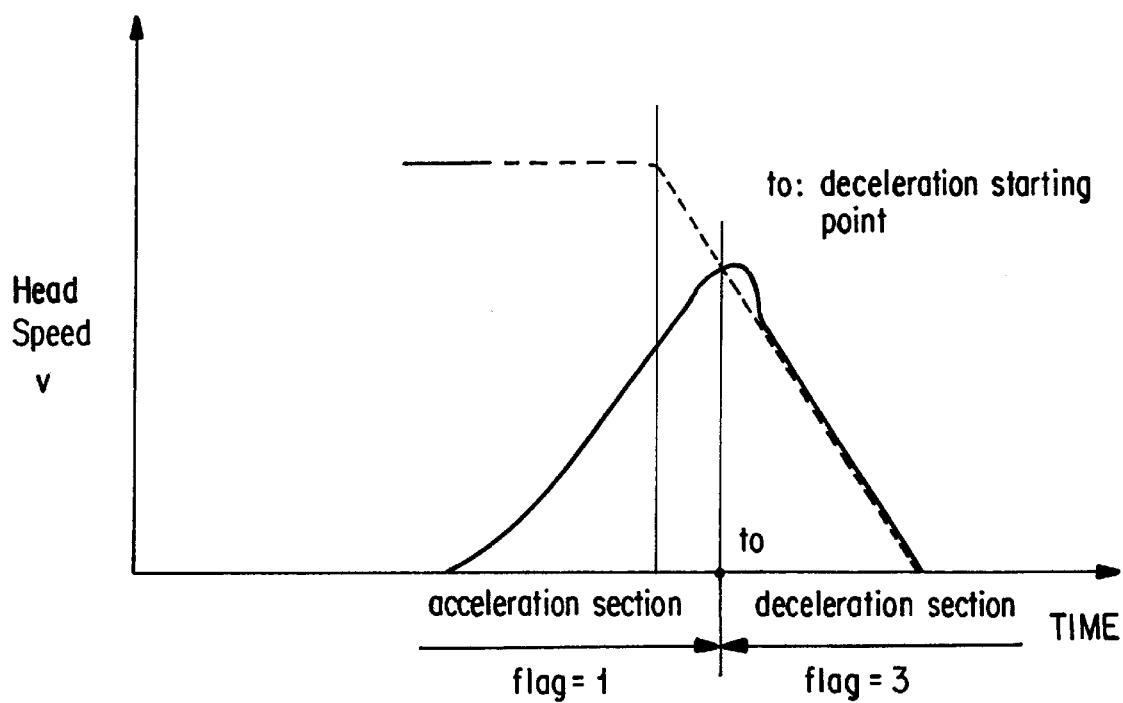

FIG. 4c shows another response curve for the head speed without the presence of the constant speed section.

Referring back to FIG. 4, the feed forward control input signal ua(k) is computed by multiplying the signal sa(k) with the gain (k) of the variable gain 10 in Step 109. In Step 110, the variable gain 10 is updated from $\theta(k)$ to $\theta(k+1)$ by using equation (5) above so as to minimize the speed error ev(k). $\theta(k+1)$ is used to compute the feed forward control input (step 109) in the next (k+1-th) repetition.

In step 112, the control input u(k) input to the object to be controlled 1 is found by adding the feedback control input uv(k) found in Step 106 and the feed forward control input ua(k) found in Step 109 or 111. Steps 102 through 112 are repeated sequentially until the head reaches the vicinity of the target position in Step 113. When the head reaches the vicinity of the target position, the control system is changed from the speed control system to the position control system in order to control the head so as to follow the target position in Step 114.

In order to verify the effectiveness of the present embodiment, the results of a simulation wherein a loop gain km of the object to be controlled 1 was increased by +20% and the head was caused to seek a distance over ⅓ of all of the movable tracks, will be shown below.

Figure 5A:
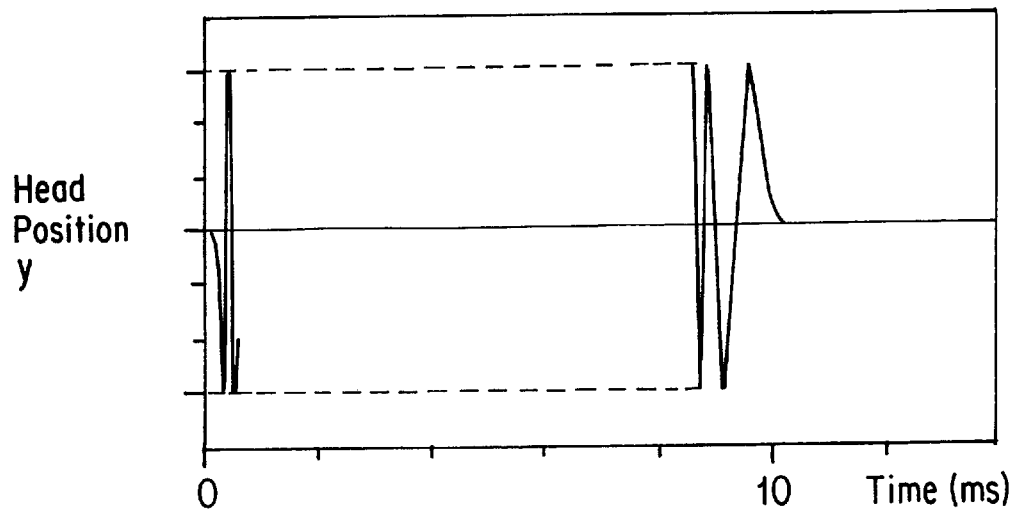
FIGS. 5a through 5d are graphical charts of the responses of the seek operation according to one embodiment of the present invention wherein a gain of the object to be controlled fluctuates by +20%.
Figure 5B:
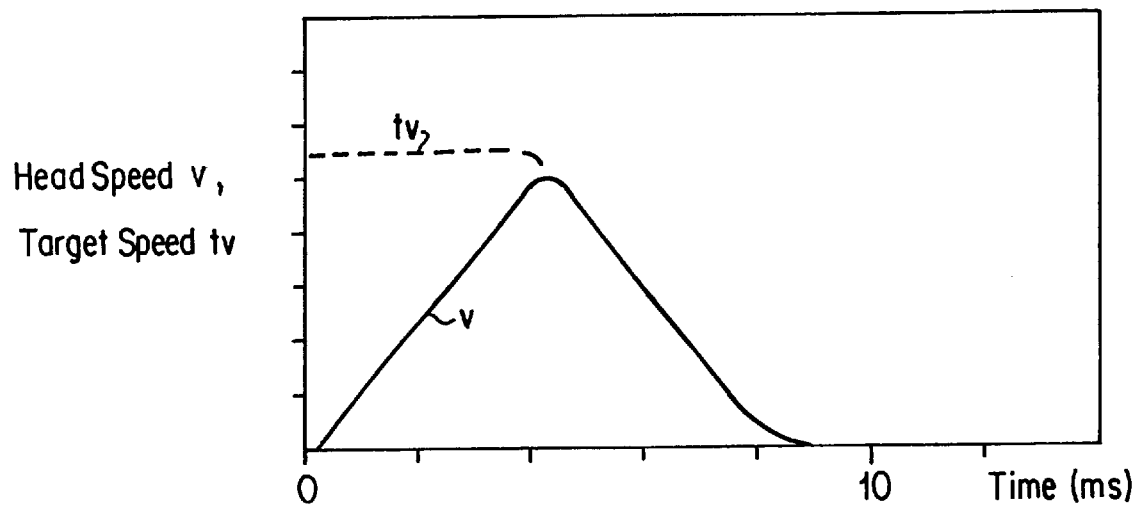
Figure 5C:
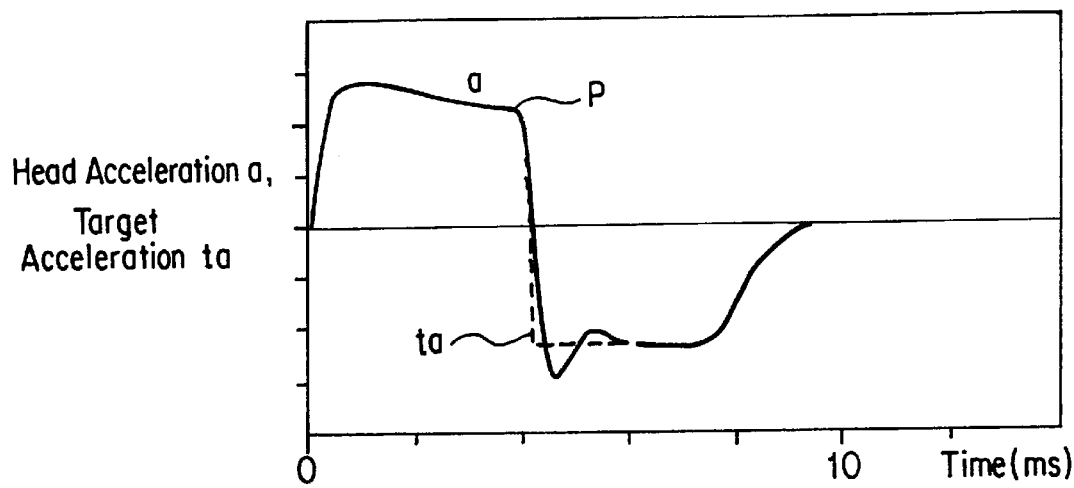
Figure 5D:
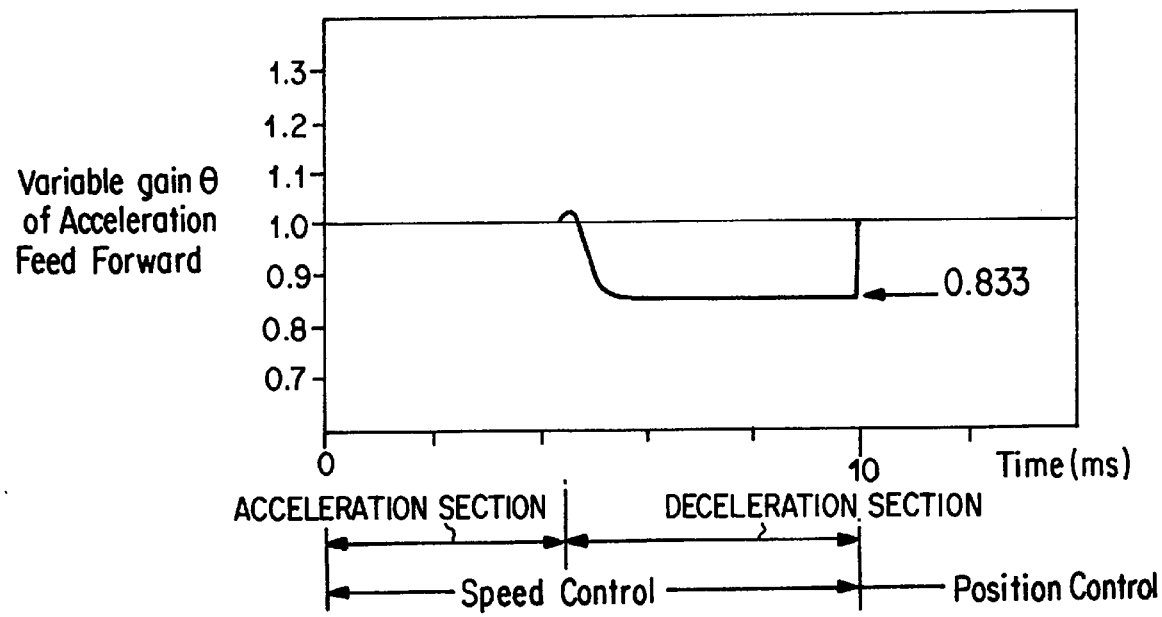
Figure 6A:
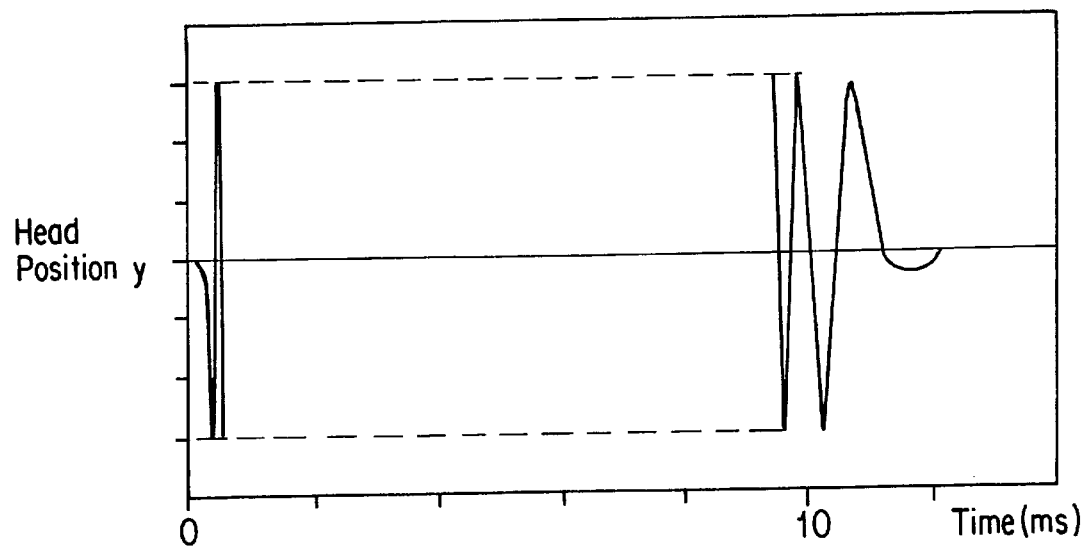
FIGS. 6a through 6c are graphical charts of the responses of the seek operation according to a prior art speed control wherein a gain of an object to be controlled fluctuates by +20%.
Figure 6B:
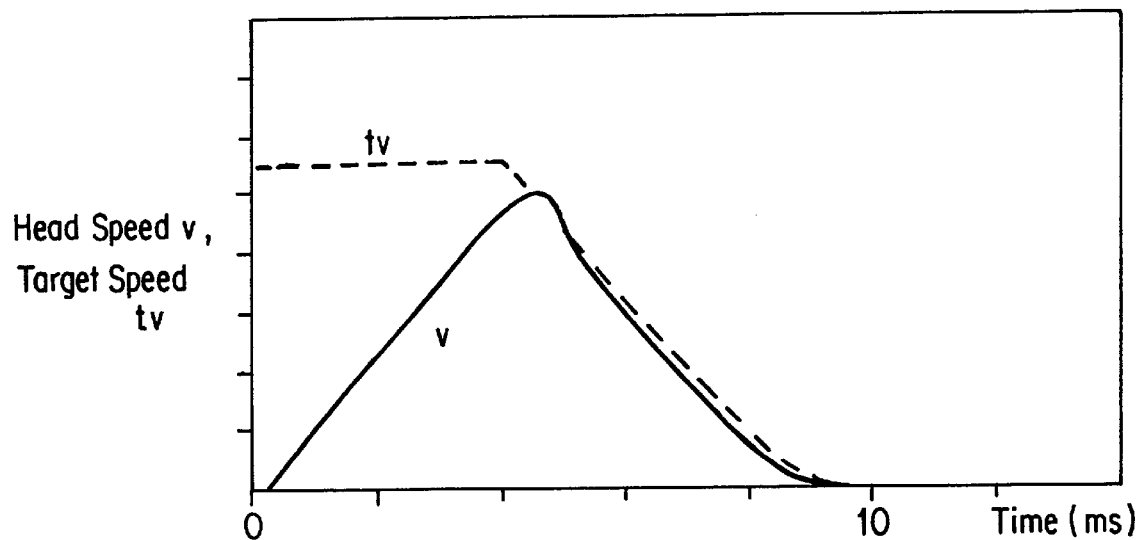
Figure 6C:
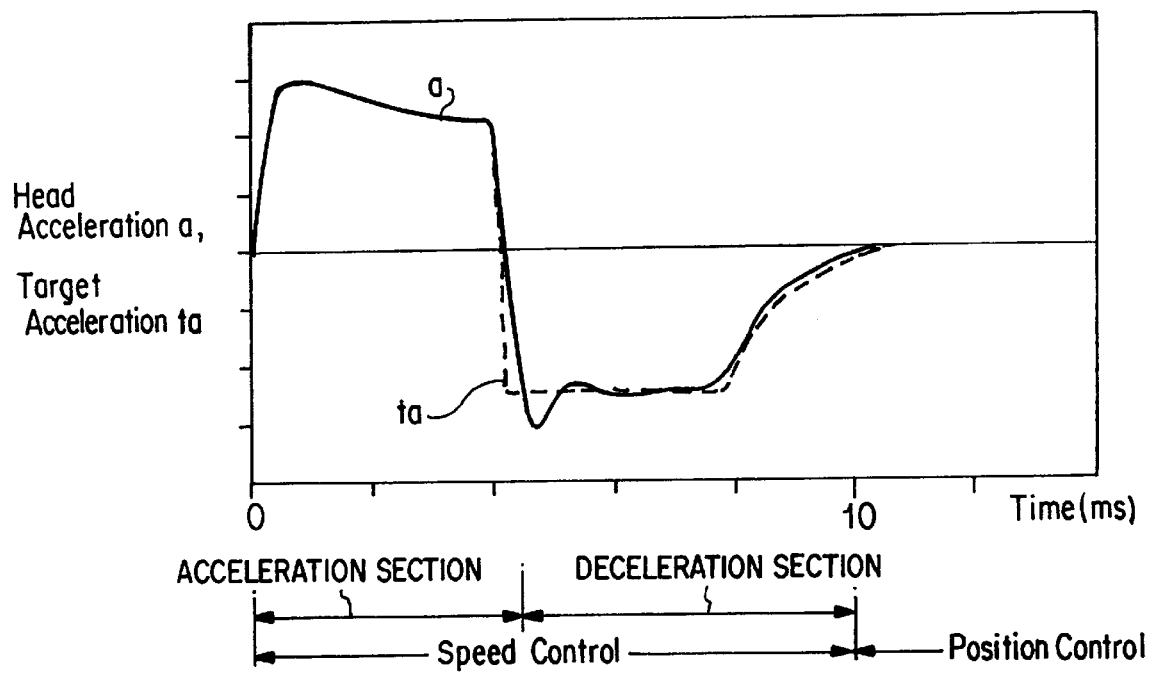

FIGS. 5a through 5d are charts showing the responses of the seek operation when the acceleration feed forward signal is controlled using the adaptive controller 12 and FIGS. 6a through 6c are charts showing the responses of the prior art seek operation wherein no adaptive controller is used. A target speed curve and a target acceleration curve of the head were conditioned such that the gain of the object to be controlled would not fluctuate and such that the speed control is finished in 10 ms and the control is shifted to the following operation, i.e. the position control. The target acceleration curve was set so as to attenuate exponentially just before a target track is reached.

In FIGS. 5a through 5d, the head position signal y(k) is plotted in FIG. 5a, the head speed signal v(k) (solid line) and the target speed signal tv(k) (broken line) are plotted in FIG. 5b, the head acceleration a (k) (solid line) and the target acceleration signal ta(k) (broken line) are plotted in FIG. 5c and the gain (k) of the variable gain 10 estimated by the adaptive control rule 11 is plotted in FIG. 5d. The control rule of equation (5) which minimizes the evaluation function of equation (1) was used as the adaptive control rule.

The estimation is started during deceleration, i.e. from point P in FIG. 5c, where the head speed reaches to the target speed signal (FIG. 5b). Because the loop gain of the object to be controlled fluctuates +20%, the acceleration feed forward variable gain θ(k) converges to 0.833(=1/1.2) in about 1 ms. so that it cancels out the fluctuation of the gain as shown in FIG. 5d. Due to that, the head speed coincides with the target speed, the control is switched from the speed control to the position control in 10 ms., and the response of settlement of the head position is equal to the condition wherein there is no fluctuation of the gain.

Carefully observing the estimated waveform θ(k) shown in FIG. 5d, it is estimated to be on the positive side during a period of 0.3 ms. right after the start of the estimation. This happens because the variable gain of the acceleration feed forward signal is increased so that no overshoot is caused when the head speed coincides with the target speed. Thus, the evaluation function represented by equation (1) minimizes the evaluation function by the current sample value without relying on the past data. Thereby, it becomes possible to suppress not only the fluctuation of the gain of the object to be controlled, but also the overshoot which might otherwise be caused when the head speed is accelerated and reaches the target speed. That is, the head is positioned rapidly with high precision by one seek operation and the succeeding following operation regardless of the fluctuation of the gain of the object to be controlled by sequentially controlling it during the seek.

In the prior art method shown in FIGS. 6a through 6c in which the acceleration feed forward signal is not controlled, the head speed signal v(k) (solid line) is offset from the target speed signal tv(k) (broken line) when the gain of the object to be controlled fluctuates by +20%. The head acceleration signal a (k) (solid line) is also unable to follow the target acceleration signal ta(k) (broken line). Here, it takes 10.7 ms for the speed control to occur and the access time increases because the head is settled while overshooting when the control is switched to the position control.

The results of a simulation carried out when the loop gain of the object to be controlled was reduced by 20% and a distance of ⅓ of the entire movable tracks is sought, will be explained with reference to FIGS. 7a through 7d and 8a through 8c. FIGS. 7a through 7d are charts of the responses when the acceleration feed forward signal is controlled using the adaptive control rule represented by equation (5) above, and FIGS. 8a through 8d are charts showing the responses of the prior art seek operation in which no adaptive control rule is used. The target speed curve and the target acceleration curve are the same with those shown in FIGS. 5 and 6.

Figure 7A:
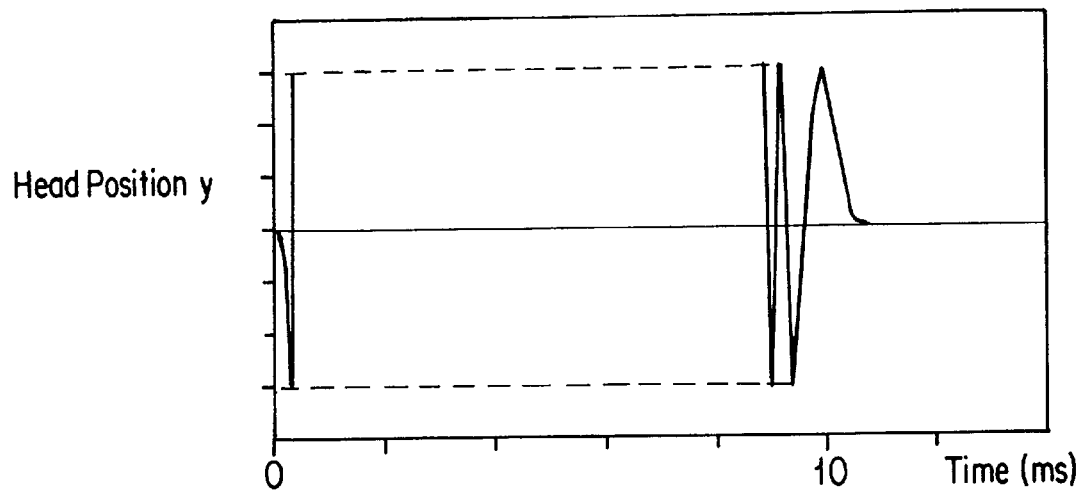
FIGS. 7a through 7d are graphical charts of the responses of the seek operation according to one embodiment of the present invention wherein the gain of the object to be controlled fluctuates by −20%.
Figure 7B:
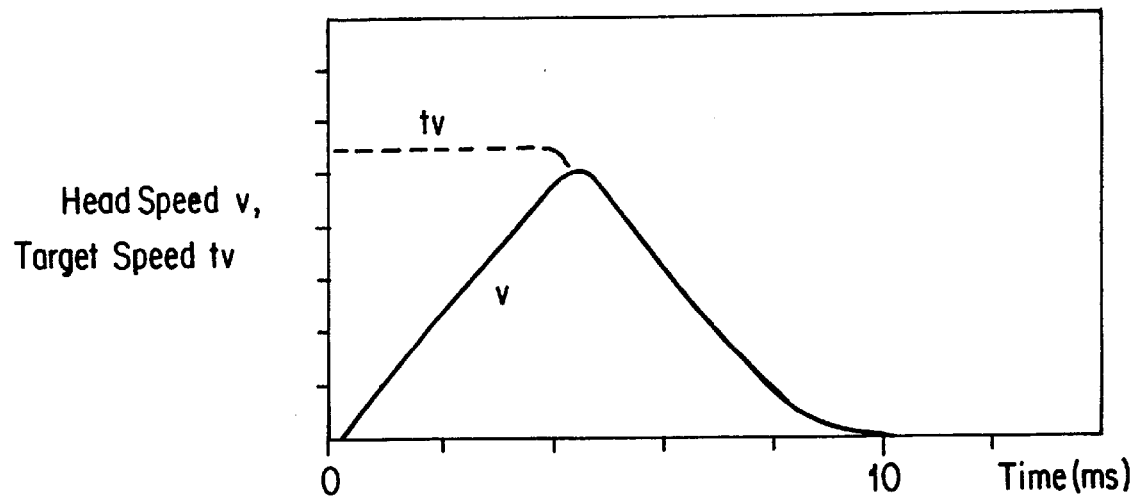
Figure 7C:
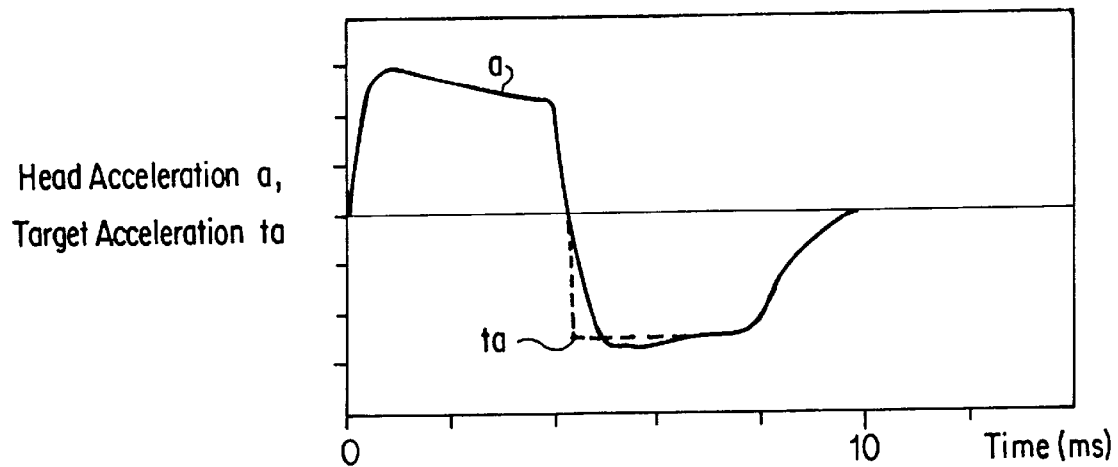
Figure 7D:
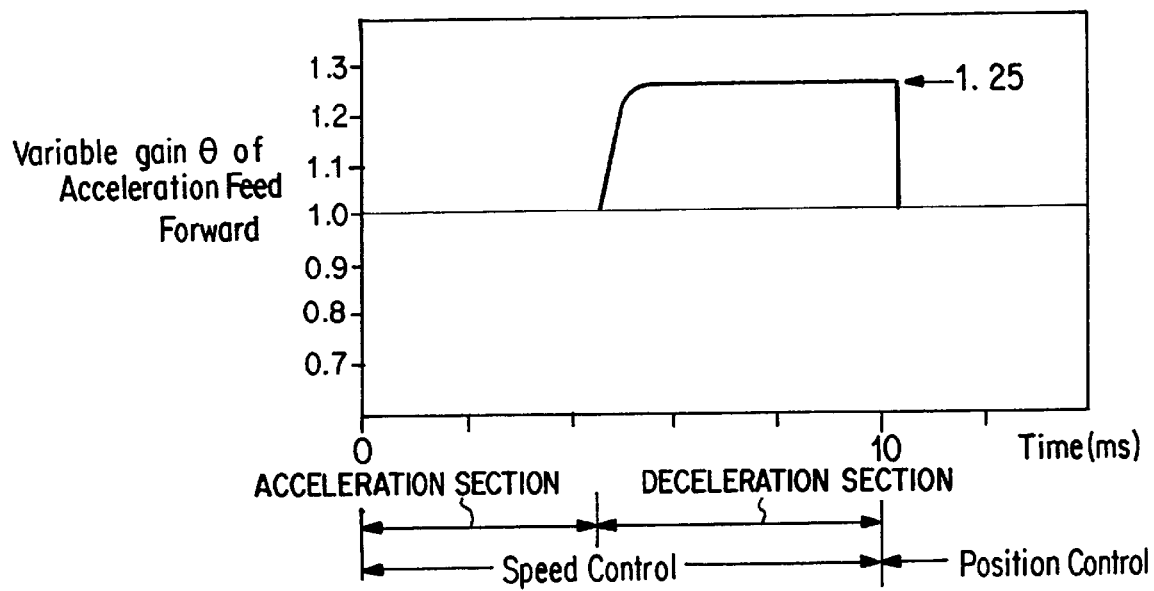
Figure 8A:
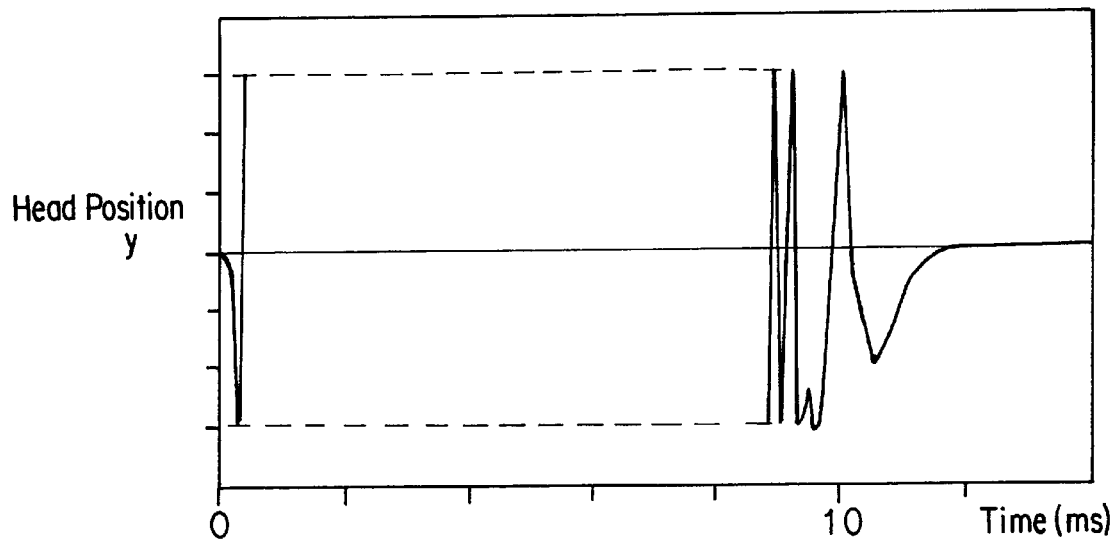
FIGS. 8a through 8c are graphical charts of the responses of the seek operation according to the prior art speed control wherein the gain of the object to be controlled fluctuates by −20%.
Figure 8B:
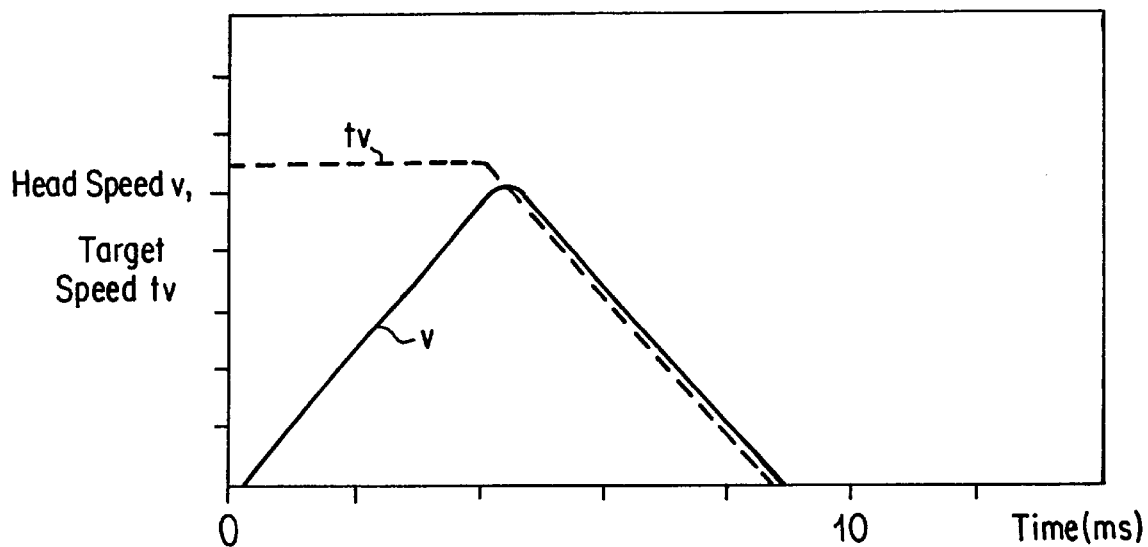
Figure 8C:
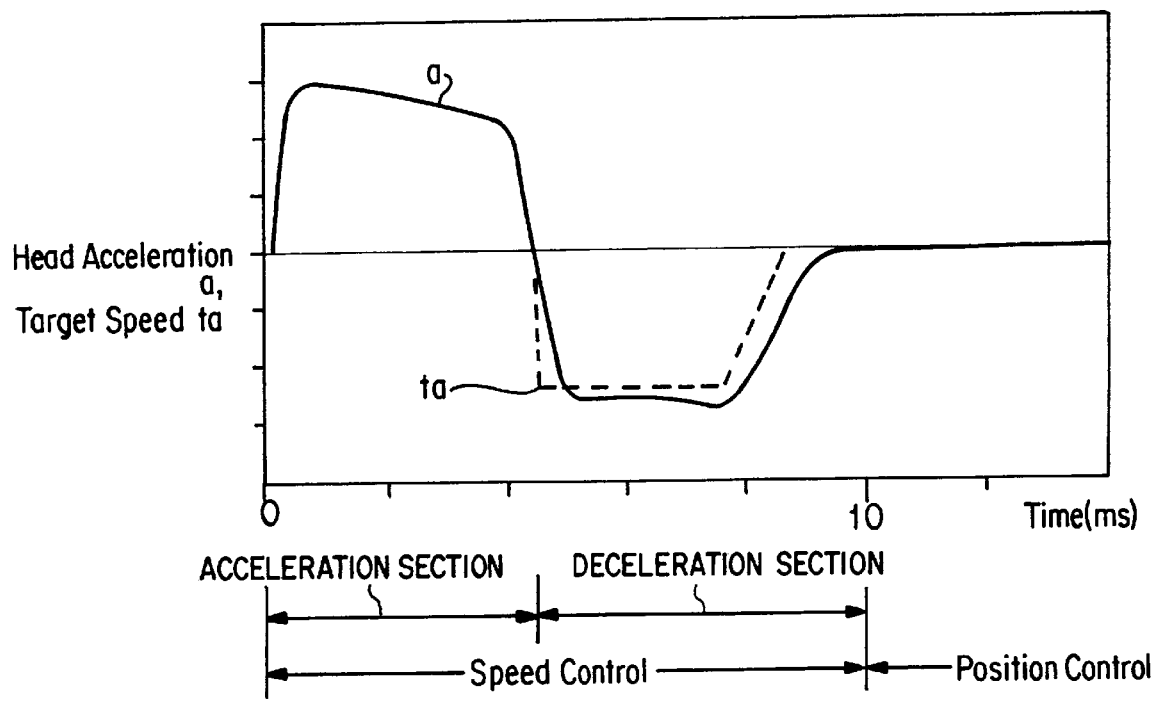

In the response of the seek operation of the present embodiment shown in FIG. 7, the variable gain θ(k) shown in FIG. 7d, estimated by the adaptive control rule, converges to 1.25 (=1/0.8) in about 1 ms. because the loop gain of the object to be controlled fluctuates by 20%. Due to that, the head speed coincides with the target speed and the control is switched from the speed control to the position control in 10 ms. A settlement response of the head position equal to the nominal state, wherein there is no fluctuation of the gain, could be obtained.

On the other hand, in the method shown in FIG. 8 in which the acceleration feed forward signal is not controlled, the head speed signal v(k) (solid line) is offset from the target speed signal tv(k) (broken line) when the gain of the object to be controlled fluctuates by −20%. The head acceleration signal a(k) (solid line) is also unable to follow the target acceleration signal ta(k) (broken line). Thereby, the speed control time is shorted to about 9 ms. and a rush speed and a rush acceleration become large when the control is switched to the position control. Thus, it takes more time to settle the head and the access time is increased.

Figure 9:
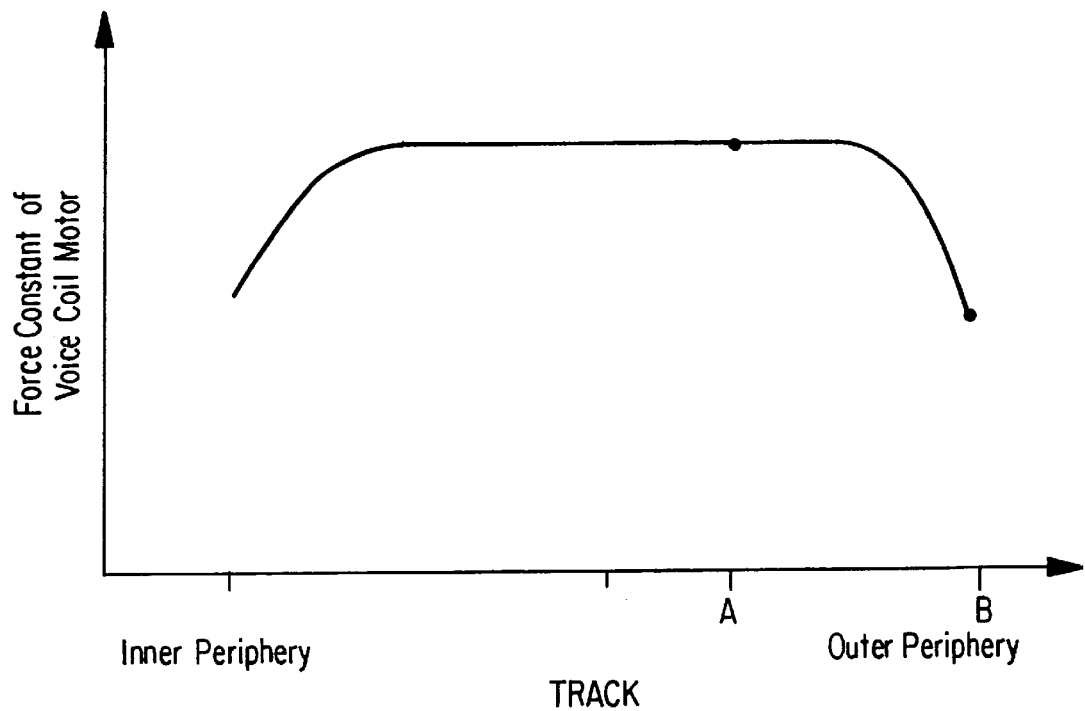
FIG. 9 is a graph showing a relationship between track positions and a force constant of a voice coil motor.

FIG. 9 shows a force constant which is a constant when a current flowing within the voice coil motor 37 for driving the head is converted into torque. The voice coil motor 37 is a rotary type motor and a gain of the force constant is apt to become small in the tracks located at the outer and inner diameter sides of the disk. Assume now that the head is moved from a track position A to a track position B at the outermost diameter, because the gain is small at the outer diameter side, the capability for following the target speed and the target acceleration degrades around the time when the seek operation ends and, as a result, the response in positioning the head to the target track fluctuates.

Figure 10:
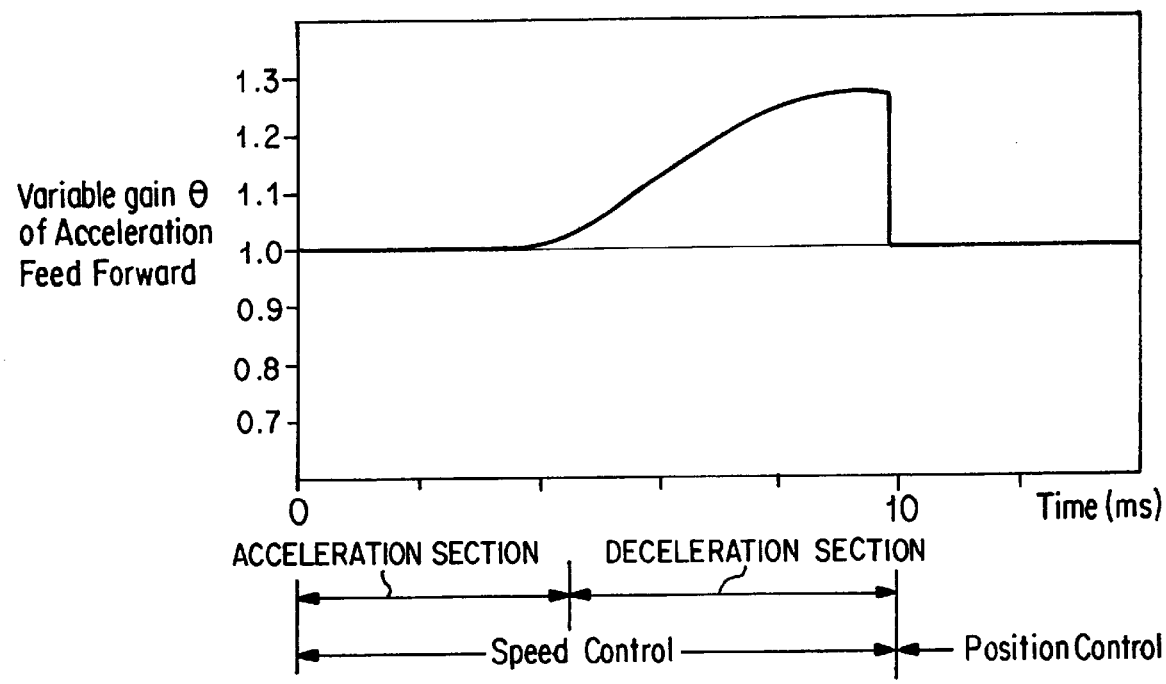
FIG. 10 is a graphical chart of the response of an acceleration feed forward variable gain according to one embodiment of the present invention wherein the force constant of the voice coil motor fluctuates.

In order to eliminate such fluctuation, the acceleration feed forward variable gain is controlled so as to cancel out the decrease of the gain of the voice coil motor as shown in FIG. 10. Thereby, the head may be positioned favorably at the target track B.

The adaptive controller 12 of the present invention controls the acceleration feed forward variable gain sequentially in real-time during the seek operation and allows an increase in the speed error caused by environmental changes such as temperature and humidity to be suppressed.

The adaptive control rule 11 represented by equation (2) is supposed to be used in a discrete time control system by means of a data plane servo method. The control rule 11 updates the variable gain discretely. For a continuous time control system by means of the servo plane servo method, an adaptive control rule may be represented by the following equation (8) with respect to time t;

$$\theta(t) = -\eta \frac{\partial E(t)}{\partial \theta(t)} \qquad (8)$$
$$= \eta \cdot u_v(t) \cdot s_a(t)$$

Further, because the target acceleration is added only when the speed is decelerated, the value of the target acceleration is always negative. Due to that, although equation (6) of the learning gain η which guarantees the convergence of the estimated value θ(k) is always satisfied, there is a possibility that sa(k) may become zero in a general unit, so that the learning gain η (fixed gain) may be found from the following equation (9) as a variable gain η(k);

$$\eta(k) = \frac{1}{\lambda + s_a(k)^2} \qquad (9)$$

Here, λ is a positive constant. Apparently, equation (9) satisfies equation (6).

The adaptive control rule 11 of the present embodiment may be used not only in equation (5) for minimizing the evaluation function expressed by equation (1), but also in the following equation (10). The equation (10) controls the acceleration feed forward variable gain θ(k) in real-time so as to minimize a square sum of the speed error signal;

$$E(k) = \frac{1}{2}\sum_{i=0}^{k} u_v(i)^2 \qquad (10)$$

$$= \frac{1}{2}\sum_{i=0}^{k} (u(i) - \theta(i) \cdot s_a(i))^2$$

A minimum value of equation (10) may be obtained by finding θ(k) which satisfies the following equation (11);

$$\frac{\partial E(k)}{\partial \theta(t)} = -\left(\sum_{i=0}^{k} s_a(i)u(i) - \sum_{i=0}^{k} s_a(i)^2 \cdot \theta(i)\right) \qquad (11)$$

$$= 0$$

Figure 2:
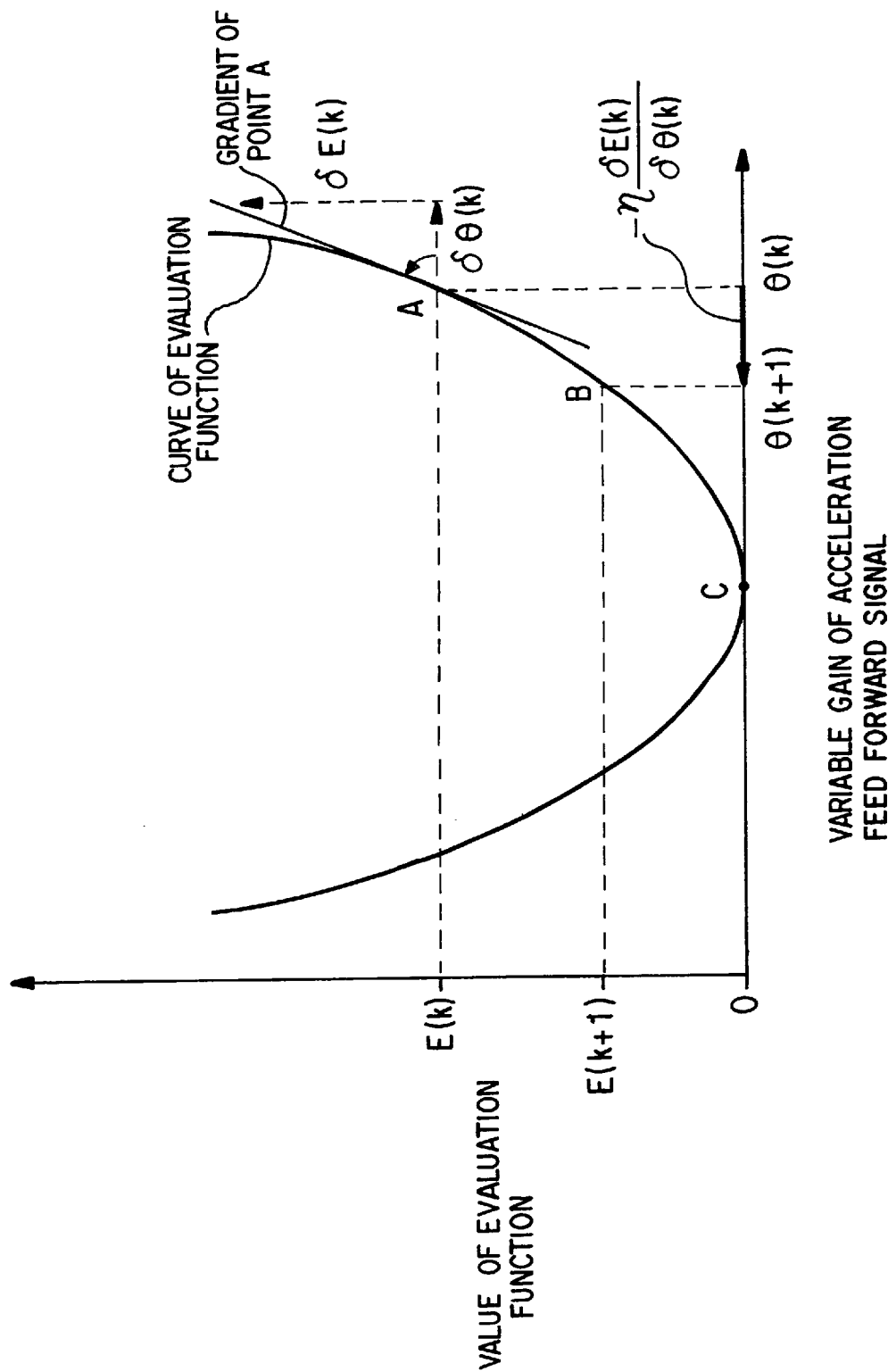
FIG. 2 is a graph showing the relationship between a variable gain θ(k) of an acceleration feed forward signal and an evaluation function E(k)

This corresponds to the case in FIG. 2 wherein the value of θ(k) at point C is found directly. Solving equation (11) for θ(k) yields the following equation (12);

$$\theta(k) = \left\{\sum_{i=0}^{k} s_a(i)^2\right\}^{-1} \cdot \left\{\sum_{i=0}^{k} s_a(i)u(i)\right\} \qquad (12)$$

Because equation (11) is not suited to sequential calculation, it is changed so as to be calculated sequentially in real-time during the seek operation. The adaptive control rule 11 which minimizes equation (9) turns out finally as the following equations (13) and (14);

$$\theta(k+1) = \theta(k) + \frac{\gamma(k)s_a(k)}{1 + \gamma(k)s_a(k)^2} u_v(k) \qquad (13)$$

$$\gamma(k+1) = \frac{\gamma(k)}{1 + \gamma(k)s_a(k)^2} \qquad (14)$$

Here, an initial value of the variable gain is set as θ(k)=1.0 and an initial value γ(0) of the learning gain, which decides the speed of convergence, is set at a positive constant.

In the present invention, the evaluation function is not confined only to those two evaluation functions described above. Rather, various control rules which reduce the speed error signal may be used. Further, the initial value θ(o) of the acceleration feed forward variable gain in the adaptive control rule may be set as the final gain value controlled during the previous seek operation. Thereby, if the gain of the object to be controlled does not fluctuate during the previous and current seek operations, a transient response caused by the control of the variable gain may be eliminated and the control system may be maintained in the optimum condition from the start of the control.

It is also possible to carry out a trial seek operation off-line and to control the gain during the trial seek, without controlling the acceleration feed forward variable gain in real-time during the seek operation. In practice, the trial seek is carried out when the power is turned on at the range of the force constant kf of the voice coil motor is flat, and a value θs of the acceleration feed forward variable gain is stored in memory. Then, the head is caused to seek several track positions wherein the force constant kf changes and a value θf of variable gain of the final one is stored in the memory corresponding to the destination track and the variable gain, respectively. When the seek operation is carried out in the section where the force constant kf is flat, a value θs of the variable gain is retrieved from the memory and is set in a gain of the acceleration feed forward operation. When the head is caused to seek a section where the force constant kf changes, the seek operation is carried out by using the value θf of the acceleration feed forward variable gain in the vicinity of the destination track.

Although only the acceleration feed forward gain has been controlled in the present embodiment, each gain of a filter may be controlled sequentially so that the speed error is minimized when the filters are included in the acceleration feed forward operation.

Figure 11:
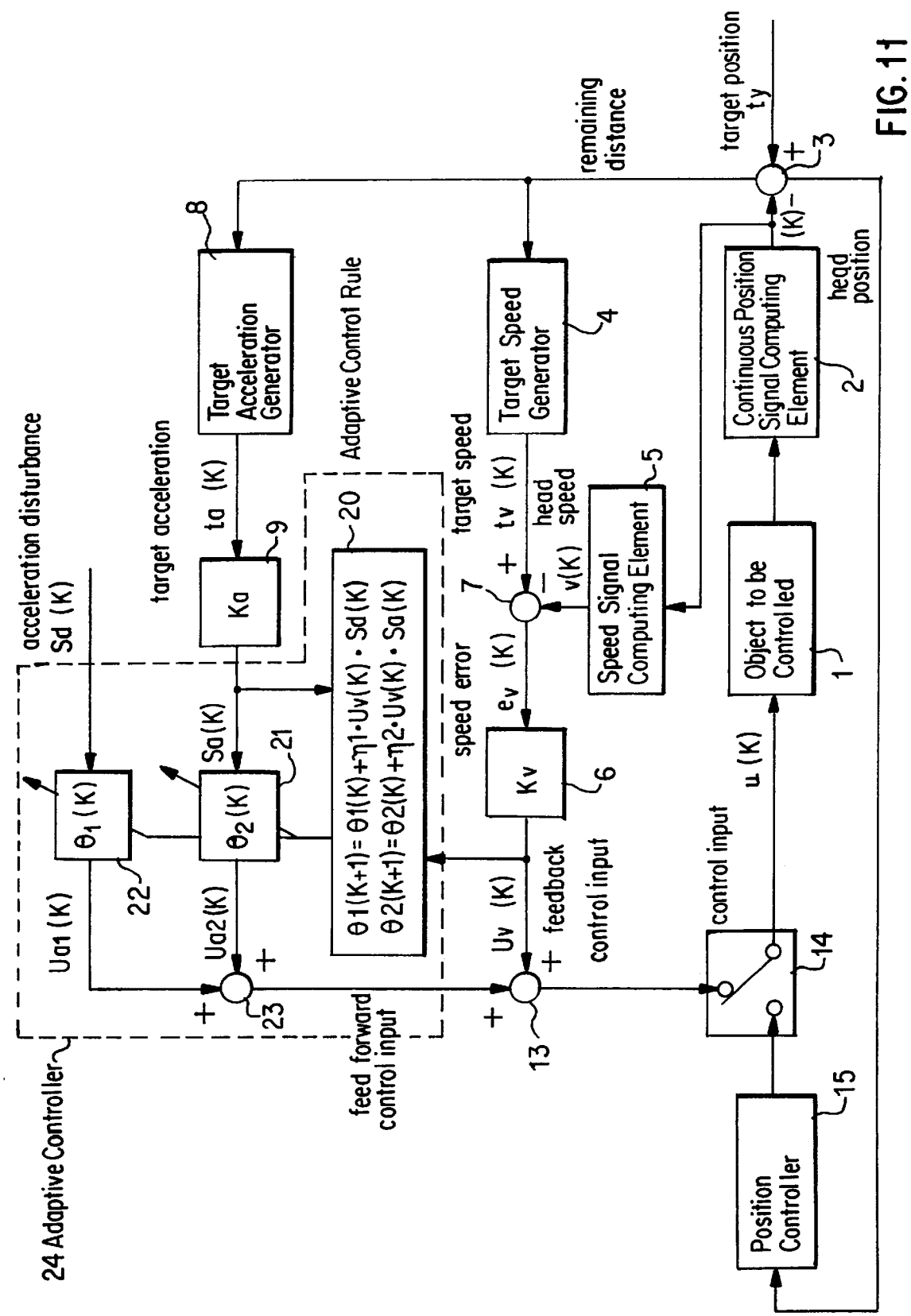
FIG. 11 is a block diagram of a head positioning adaptive control system according to another embodiment of the present invention.

FIG. 11 is a block diagram of another embodiment of a positioning adaptive control device of the present invention.

The present embodiment is different from the above-mentioned embodiment in that the acceleration feed forward control input ua(k) is obtained from the target acceleration ta(k) and an acceleration disturbance sd(k). Two variable gains are attached to the adaptive controller 12 used in the above-mentioned embodiment to be able to deal with the acceleration disturbance sd(k). That is, beside the target acceleration, the acceleration disturbance is also added in the control input. In this case, two adaptive control rules 20 are also set.

An acceleration disturbance signal may be obtained by mounting an acceleration pickup sensor on a base and by measuring an acceleration vibration of the base during seek operation. It is also possible to measure a force disturbance of the FPC for transmitting the head recording/reproduction signal to the circuit board to input as the acceleration disturbance sd(k). When it is impossible to measure the acceleration disturbance, it is possible to set sd(k)=1.0, supposing that there is a constant acceleration disturbance acting on the device.

A method for controlling a gain value $\theta_1(k)$ of a variable gain controller 22 for the acceleration disturbance sd(k) and a gain value $\theta_2(k)$ of a variable gain controller 21 for the target acceleration ta(k) will be explained below. An evaluation function for minimizing a speed error ev(k) may be expressed by the following equation (15);

$$E(k) = \frac{1}{2} u_v(k)^2 \qquad (15)$$

$$= \frac{1}{2}(u(k) - u_{a1}(k) - u_{a2}(k))^2$$

The evaluation function shown in equation (15) is minimized by using the gradient method and a value of uv(k) is substituted into an adaptive control rule 20 expressed by the following equations (16) and (17) to control the variable gains $\theta_1(k)$ and $\theta_2(k)$ in real-time. The variable gains are not controlled when the head is accelerated.

$$\theta_1(k+1) = \theta_1(k) - \eta \frac{\partial E(k)}{\partial \theta_1(k)} \qquad (16)$$

$$= \theta_1(k) - \eta \frac{\partial E(k)}{\partial u_{a1}(k)} \cdot \frac{\partial u_{a1}(k)}{\partial \theta_1(k)}$$

$$= \theta_1(k) + \eta \cdot (u(k) - u_{a1}(k) - u_{a2}(k)) \cdot s_a(k)$$

$$= \theta_1(k) + \eta \cdot u_v(k) \cdot s_a(k)$$

-continued $$\theta_2(k+1) = \theta_2(k) - \eta \frac{\partial E(k)}{\partial \theta_2(k)} \quad (17)$$

$$= \theta_2(k) - \eta \frac{\partial E(k)}{\partial u_{a2}(k)} \cdot \frac{\partial u_{a2}(k)}{\partial \theta_2(k)}$$

$$= \theta_2(k) + \eta \cdot (u(k) - u_{a1}(k) - u_{a2}(k)) \cdot s_a(k)$$

$$= \theta_2(k) + \eta \cdot u_v(k) \cdot s_a(k)$$

where, η is a learning constant which decides the speed of convergence of the variable gains $\theta_1(k)$ and $\theta_2(k)$.

Initial values $\theta_1(0)$ and $\theta_2(0)$ of the variable gains are both set at $\theta_1(0)=1.0$ and $\theta_2(0)=1.0$.

As described above, because the variable gains which can deal with the disturbance are provided anew, the disturbance applied to the object to be controlled 1 may be suppressed rapidly with high precision during the seek operation and the head access time may be shortened.

Figure 12:
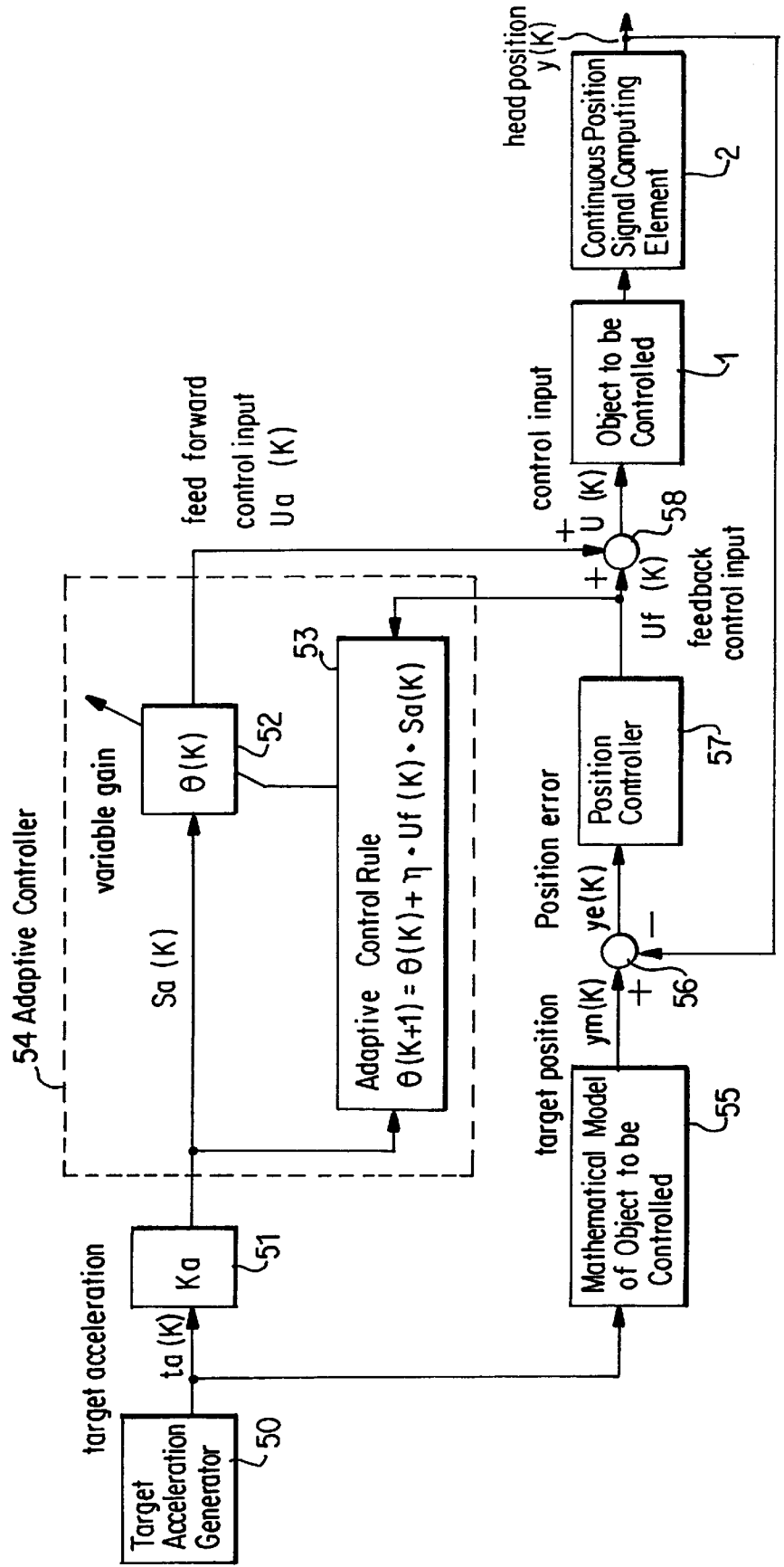
FIG. 12 is a block diagram of a head positioning adaptive control system according to still another embodiment of the present invention.

FIG. 12 is a block diagram showing another embodiment of a head positioning adaptive control device according to the present invention.

The present embodiment is different from the embodiment shown in FIG. 1 in that the head is moved to a target track only by the position control system, not using the speed control system. A target acceleration generator 50 generates a tertiary smooth acceleration orbit which is expressed by the following equation (18) so that the time change of the control input u(k) is minimized for example;

$$t_a(k) = \frac{L}{T_d^2}\left\{120\left(\frac{kT}{T_d}\right)^3 - 180\left(\frac{kT}{T_d}\right)^2 + 60\left(\frac{kT}{T_d}\right)\right\} \quad (18)$$

Where, L is a seek moving distance, T is a sampling time and Td is the time necessary for the move.

In FIG. 12, the target acceleration ta(k) is input to a mathematical model 55 of the object to be controlled in order to generate a target position signal ym(k). For example, when the mathematical model is expressed by a double integral, the target position is a quintic orbit expressed by the following equation (19);

$$y_m(k) = L\left\{6\left(\frac{kT}{T_d}\right)^5 - 15\left(\frac{kT}{T_d}\right)^4 + 10\left(\frac{kT}{T_d}\right)^3\right\} \quad (19)$$

A position controller 57 is equipped with a phase compensating filter or the like in order to reduce the position deviation error ye(k) between an actual position y(k) and a target position ym(k) of the head. The position controller 57 produces a feedback control input uf(k).

The target acceleration ta(k) is multiplied with a gain value ka of an acceleration gain controller 51 comprising an inverse gain of the loop gain of the object to be controlled 1 in order to input a signal sa(k) to an adaptive controller 54. A gain θ(k) of a variable gain controller 52 of the acceleration feed forward operation is controlled so that the feedback control input uf (k) is minimized. When the feedback control input uf (k) converges to zero, the position deviation error ye(k) also converges to zero. That is, the evaluation function expressed by the following equation (20) is minimized;

$$E(k) = \frac{1}{2}u_f(k)^2 \quad (20)$$

$$= \frac{1}{2}(u(k) - u_a(k))^2$$

The above evaluation function is minimized by using the gradient method and a value of $u_f(k)$ is substituted into an adaptive control rule 53 expressed by the following equation (21) to control the variable gain θ(k) of the acceleration feed forward operation in real-time. The variable gain is controlled when the seek operation is started.

$$\theta(k+1) = \theta(k) - \eta \frac{\partial E(k)}{\partial \theta(k)} \quad (21)$$

$$= \theta(k) - \eta \frac{\partial E(k)}{\partial u_a(k)} \cdot \frac{\partial u_a(k)}{\partial \theta(k)}$$

$$= \theta(k) + \eta \cdot (u(k) - u_a(k)) \cdot s_a(k)$$

$$= \theta(k) + \eta \cdot u_f(k) \cdot s_a(k)$$

where, η is a learning constant which decides a speed of convergence of the variable gain θ(k).

The initial value θ(0) of the variable gain is set at θ(0)=1.0. It is possible to update the learning gain η within equation (21) by the variable gain η(k) expressed by equation (9). Here, if the object to be controlled 1 and the mathematical model 55 of the object to be controlled are the same, and the head position y(k) and the target position ym(k) are equal, then the position controller 57 is not actuated and the feedback control input uf(k) is zero. At this time, the adaptive control rule also does not act and the feed forward control input ua(k) turns out as a control input u(k) for directly driving the object to be controlled 1.

However, when the object to be controlled 1 is not the same as the mathematical model 55 of the object to be controlled, the position deviation error ye(k) is produced and the position controller 57 generates the feedback control input uf(k) for suppressing the error. The adaptive control rule 53 controls the variable gain θ(k) of the acceleration feed forward operation sequentially by equation (21) so that the feedback control input uf(k) is minimized. As the control of the variable gain of the acceleration feed forward advances, the feedback control input uf(k) converges to zero and the position deviation error ye(k) is eliminated.

While the head positioning time is delayed by being affected by the fluctuation of the gain when the gain of the object to be controlled fluctuates in the prior art method as described above, the present embodiment allows the head to be moved rapidly with high precision to the target position even if the gain of the object to be controlled fluctuates. The present embodiment allows an effect similar to the embodiment shown in FIG. 1 to be obtained even if the speed control system is omitted.

Figure 13A:
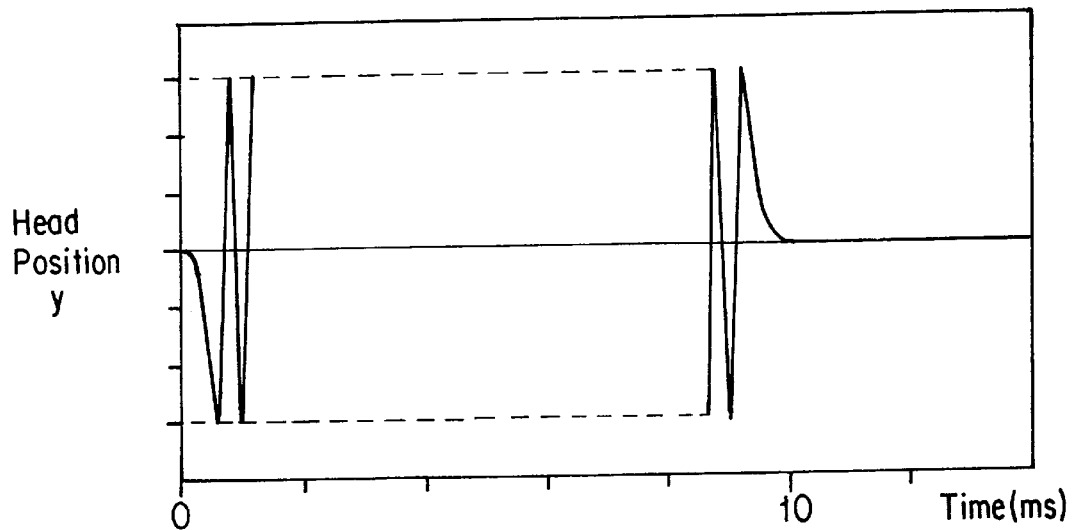
FIGS. 13a through 13c are graphical charts of the responses of a seek operation of the embodiment shown in FIG. 12, wherein a gain of an object to be controlled fluctuates by +20%.
Figure 13B:
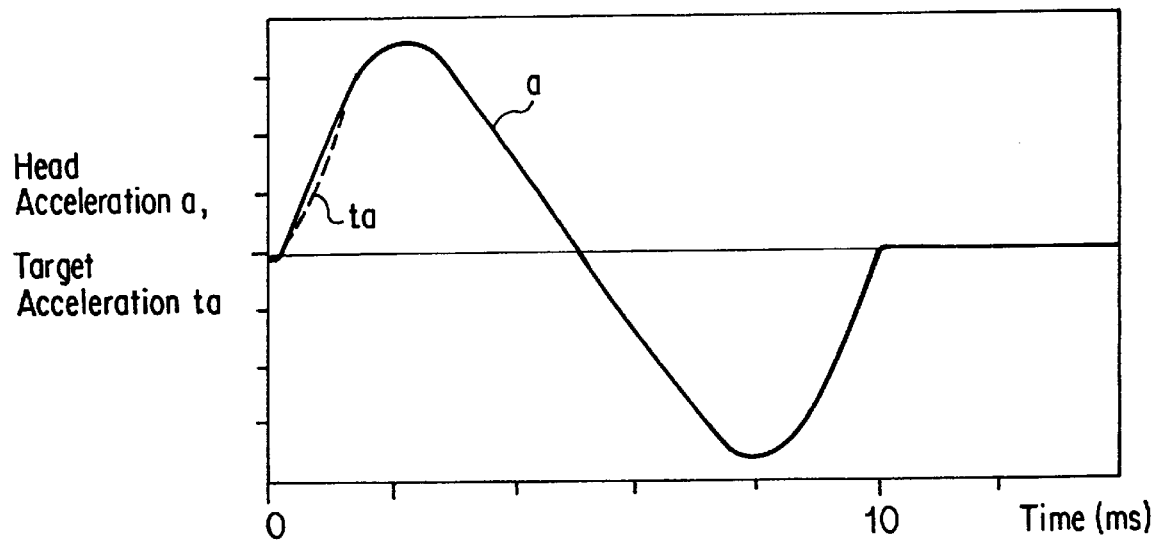
Figure 13C:
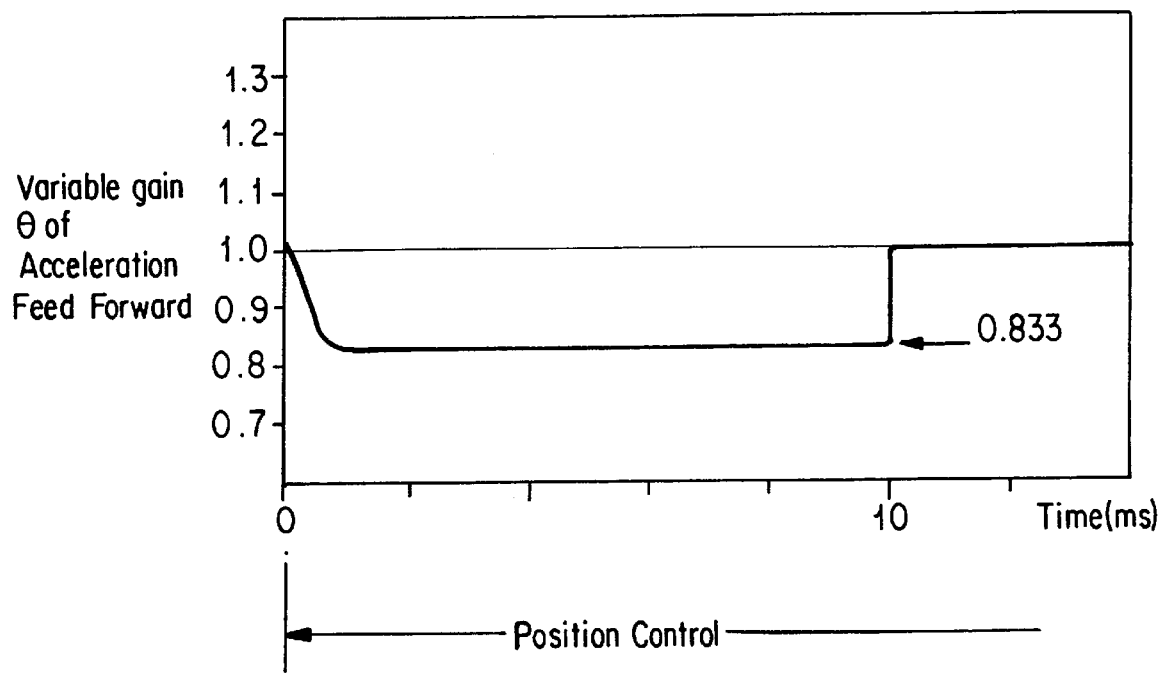
Figure 14A:
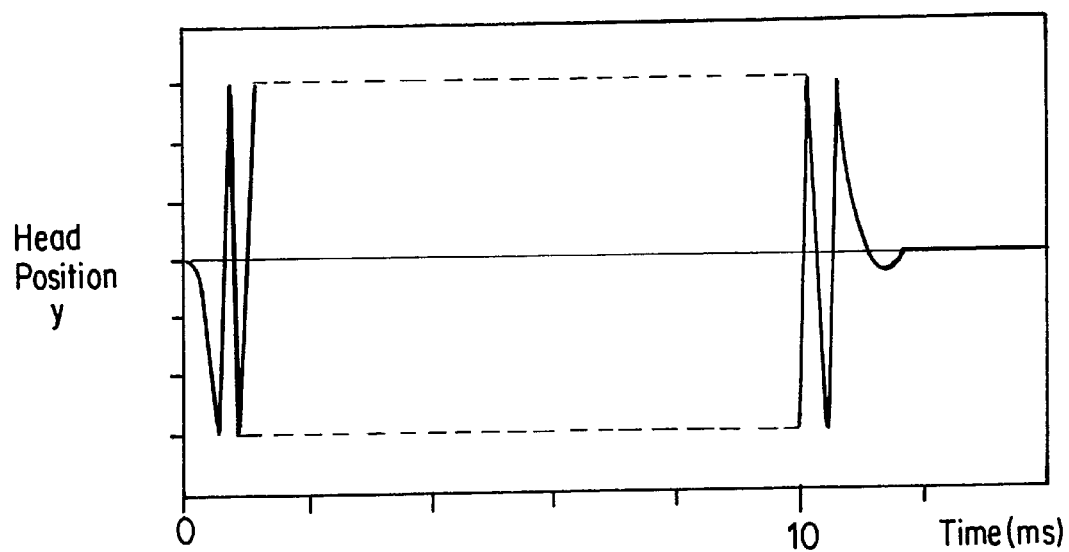
FIGS. 14a and 14b are graphical charts of responses of a seek operation according to a prior art position control, wherein a gain of an object to be controlled fluctuates by +20%.
Figure 14B:
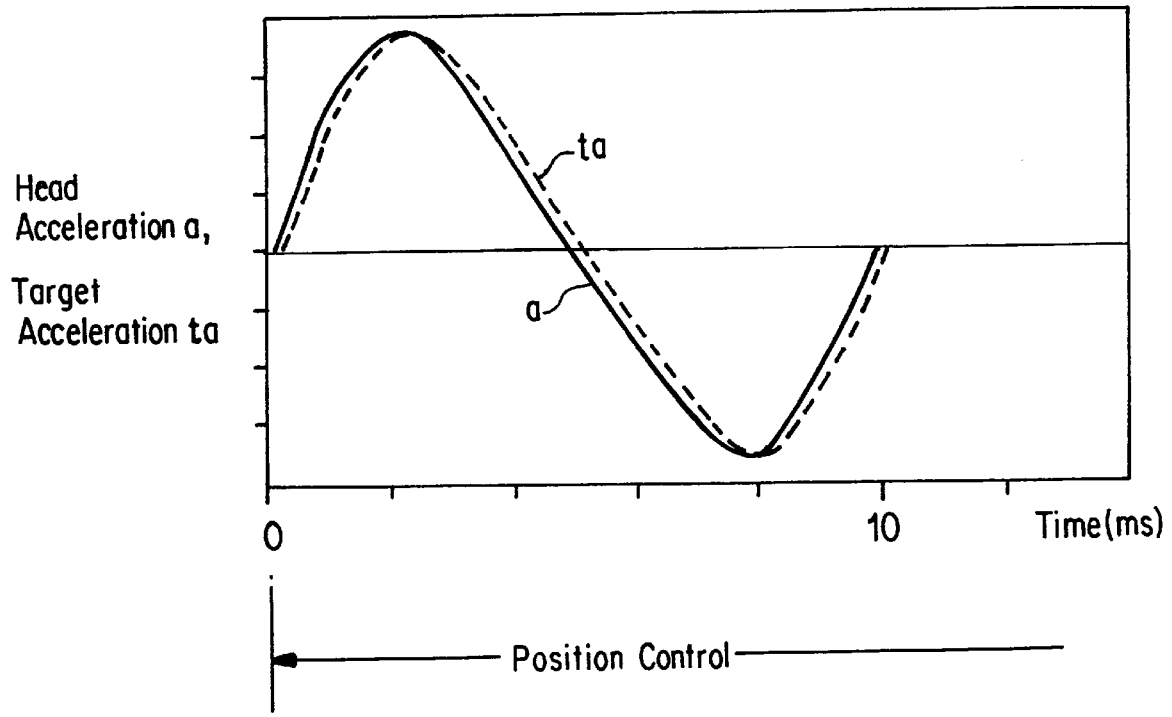

The results of a simulation in which the loop gain of the object to be controlled 1 was increased by +20% and a distance of ⅓ of the whole movable tracks was sought by the head is shown in FIGS. 13a through 13c and FIGS. 14a and 14b. FIGS. 11a through 13c are charts of the responses of the seek operation when the acceleration feed forward signal is controlled by the adaptive controller 54 used in the embodiment shown in FIG. 12, and FIGS. 14a and 14b are charts of the responses of a prior art seek operation in which no adaptive controller 54 is used. A target acceleration curve of the head was conditioned so that a gain of the object to be controlled would not fluctuate and that the seek operation ends in 10 ms.

In FIGS. 13a through 13c, the head position signal y(k) is plotted in FIG. 13a, the head acceleration a(k) (solid line) and a target acceleration signal ta(k) (broken line) are plotted in FIG. 13b, and the variable gain θ(k) estimated by the adaptive control rule 53 is plotted in FIG. 13c. As an adaptive control rule, the control rule expressed by equation (21) which minimizes the evaluation function of equation (20) was used. The variable gain θ(k) is estimated from when the head begins to move. Because the loop gain of the object to be controlled fluctuates by +20%, the acceleration feed forward variable gain θ(k) cancels out the fluctuation of the gain and converges to 0.833(=1/1.2) in about 1 ms. The head acceleration coincides with the target acceleration and the seek operation was finished in 10 ms. The same response of settlement of the head position with the nominal state in which the gain does not fluctuate in shifting to the following operation was obtained.

On the other hand, in the prior art method shown in FIGS. 14a and 14b in which the acceleration feed forward signal is not controlled, it can be seen that when a gain of the object to be controlled fluctuates by +20%, an actual acceleration signal a(k) (solid line) is offset from a target acceleration signal ta(k) (broken line) of the head as shown in FIG. 14b.

Thereby, because the seek operation takes 11 ms. and the head is settled while overshooting when the control is switched to the position control, the access time is increased.

It is contemplated to add the function for compensating the acceleration disturbance in the embodiment shown in FIG. 11 to the embodiment shown in FIG. 12. It is also contemplated to obtain the feed forward control input from the target acceleration and the acceleration disturbance and to control it by the above-mentioned algorithm by providing a variable gain to each.

While the magnetic disk unit has been explained in the embodiments described above, the present invention is not confined to it. That is, the present invention may be applied to a head positioning control system of another information storage device such as a CD-ROM unit and an optical disk unit. It may be applied also to those units equipped with a positioning control system by switching a control from a speed control system to a position control system. It may be also applied to a positioning control system only by a position control system.

According to the present invention, the acceleration feed forward signal is controlled in real-time during deceleration so that the deviation between the target speed and the actual speed is reduced when the head, whose speed is controlled, is shifted from an acceleration state or a constant speed state to a deceleration state in the positioning control system in which the seek operation of the head is controlled by the speed control and the following operation is controlled by the position control. Thereby, the speed error caused by a fluctuation of the gain of an object to be controlled and/or disturbance may be minimized. Further, when the control is switched from the speed control to the position control in the vicinity of a target track, dispersion of responses of a head position and head speed after the switch may be fully suppressed, thus giving favorable settlement responses.

According to the present invention, in a positioning control system in which the seek operation and the following operation are controlled using only the position control, the acceleration feed forward signal is controlled in real-time so that a deviation between the target position and the actual position of the head when the seek operation is started, so that a position error caused by a fluctuation of the gain of an object to be controlled and/or disturbance may be minimized, thus giving a favorable settlement response when the head reaches a target track.

According to the present invention, the acceleration feed forward signal is controlled, so that the head can follow a target orbit with high precision and the target orbit which has been loosely set in the past may be set more strictly. Still further, a dispersion of the access time of the head and head positioning operation may be reduced.

While preferred embodiments of the present invention have been described, variations thereto will occur to those skilled in the art within the scope of the present inventive concepts which are delineated by the following claims.

What is claimed is:

1. A positioning adaptive control method for positioning a head on a disk via a seek operation for positioning the head to a target track on said disk and a following operation for positioning the head on the target track, the method comprising the step of sequentially adjusting a gain of a target acceleration signal for the head in a feed forward loop of a control system related to the seek operation during said seek operation so that said head is positioned to the target track rapidly with high precision during the following operation which follows said seek operation.

2. The positioning adaptive control method according to claim 1, wherein said method handles digital signals.

3. The positioning adaptive control method according to claim 1, wherein said method handles analog signals.

4. The positioning adaptive control method according to claim 1, wherein the step of sequentially controlling is carried out in synchronism with time intervals for reading position data in a sector servo.

5. A positioning adaptive control method for moving a head to a target position, the method comprising the steps of:
   adding a feedback control input based on a speed error between a target speed and a head speed and a feed forward control input based on a target acceleration;
   sequentially adjusting a gain of a control system for controlling said feed forward control input so that said speed error is reduced by using said feedback control input and said feed forward control input to control the head during movement.

6. A positioning adaptive control method for moving a head to a target position, the method comprising the steps of:
   adding a feedback control input based on a speed error between a target speed and a head speed and a feed forward control input based on a target acceleration;
   sequentially adjusting a gain of a control system for controlling said feed forward control input so that a square of said speed error is minimized by using said feedback control input and said feed forward control input to control said head when the head speed starts to decelerate.

7. The positioning adaptive control method according to claim 6, wherein the step of sequentially adjusting comprises the step of multiplying said feed forward control input with a control gain θ(k) which is updated sequentially by θ(k+1)=θ(k)+η·uv(k)·sa(k), wherein said feedback control input is denoted as uv(k), said feed forward control input as sa(k), and a learning gain as η.

8. The positioning adaptive control method according to claim 7, wherein an initial value of said control gain θ(k) is set at θ(0)=1.0.

9. The positioning adaptive control method according to claim 7, wherein a value of a final control gain controlled during a previous movement of said head is used as an initial value of said control gain θ(k).

10. A positioning adaptive control method for moving a head to a target position, the method comprising the steps of:
   adding a feedback control input based on a speed error between a target speed and a head speed and a feed forward control input based on a target acceleration;

sequentially adjusting a gain of a control system for controlling said feed forward control input so that a value obtained when square values of said speed error are added sequentially is minimized by using said feedback control input and said feed forward control input to control said head when the head speed starts to decelerate.

11. The positioning adaptive control method according to claim 10, wherein the step of sequentially adjusting comprises the step of multiplying said feed forward control input with a control gain $\theta(k)$ which is updated sequentially by $\theta(k+1)=\theta(k)+\gamma(k+1)\ uv(k)\cdot sa(k)$ when a learning gain is updated to $(k+1)$ based on said feed forward control input, wherein said feedback control input is denoted as $uv(k)$, said feed forward control input as $sa(k)$ and said learning gain as $\gamma(k)$.

12. A positioning adaptive control method for moving a head to a target position, the method comprising the steps of:
   adding a feedback control input based on a position error between a target position and a head position and a feed forward control input based on a target acceleration;
   sequentially adjusting a gain of a control system for controlling said feed forward control input so that said position error is reduced by using said feedback control input and said feed forward control input to control said head during movement.

13. A positioning adaptive control method for moving a head to a target position, the method comprising the steps of:
   adding a feedback control input based on a position error between a target position and a head position and a feed forward control input based on a target acceleration;
   sequentially adjusting a gain of a control system for controlling said feed forward control input so that a square of said position error is minimized by using said feedback control input and said feed forward control input to control said head when movement begins.

14. The positioning adaptive control method according to claim 13, wherein the step of sequentially adjusting comprises the step of multiplying said feed forward control input with a control gain $\theta(k)$ which is updated sequentially by $\theta(k+1)=\theta(k)+\eta\cdot u_f(k)\cdot sa(k)$, wherein said feedback control input is denoted as $u_f(k)$, said feed forward control input as $sa(k)$ and a learning gain as $\eta$.

15. A positioning adaptive control method for moving a head to a target position, the method comprising the step of:
   adding a feedback control input based on a position error between a target position and a head position and a feed forward control input based on a target acceleration;
   sequentially adjusting a gain of a control system for controlling said feed forward control input so that a value obtained when square values of said position error are added sequentially is minimized by using said feedback control input and said feed forward control input to control said head when movement begins.

16. The positioning adaptive control method according to claim 15, wherein the step of sequentially adjusting comprises the step of multiplying said feed forward control input with a control gain $\theta(k)$ which is updated sequentially by $\theta(k+1)=\theta(k)+\gamma(k+1)\cdot u_f(k)\cdot as(k)$ when a learning gain is updated to $\gamma(k+1)$ based on said fee forward control input, wherein said feedback control input is denoted as $u_f(k)$, said feed forward control input as $sa(k)$ and said learning gain as $\gamma(k)$.

17. A positioning adaptive control method for moving a head to a target position, the method comprising the steps of:
   adding a feedback control input based on a speed error between a target speed and a head speed, a first feed forward control input based on a target acceleration, and a second feed forward control input based on an acceleration disturbance signal;
   sequentially adjusting a gain of a control system for controlling said first and second feed forward control inputs so that said speed error is reduced by using said feedback control input, said first feed forward control input and said second feed forward control input to control said head during head movement.

18. A positioning adaptive control method for moving a head to a target position, the method comprising the steps of:
   adding a feedback control input based on a position error between a target position and a head position, a first feed forward target acceleration and a control input based on second feed forward control input based on an acceleration disturbance signal;
   sequentially adjusting a gain of a control system for controlling said first and second feed forward control inputs so that said position error is reduced by using said feedback control input, said first feed forward control input and said second feed forward control input to control said head during head movement.

19. A positioning adaptive control method for generating a control input for moving a head to a target position, the method comprising the steps of:
   adding a feedback control input based on a speed error between a target speed and a head speed and a feed forward control input based on a target acceleration, wherein a variable gain is provided at an arbitrary place from the control input for the speed signal of said head; and
   sequentially adjusting said variable gain for controlling said feed forward control input so that said speed error is reduced by using said feedback control input and said feed forward control input to generate the control input even if said variable gain is increased or reduced during head movement in order to immediately reduce said speed error which has been increased due to a gain change of said variable gain.

20. A positioning adaptive control method for generating a control input for moving a head to a target position, the method comprising the steps of:
   adding a feedback control input based on a speed error between a target speed and a head speed and a feed forward control input based on a target acceleration, wherein a variable gain is provided at an arbitrary place from the control input for the speed signal of said head;
   sequentially adjusting said variable gain for controlling said feed forward control input so that said speed error is reduced by using said feedback control input and said feed forward control input to generate the control input even if said variable gain is increased or reduced in advance to immediately equalize the speed signal of said head which has fluctuated due to a gain change of said variable gain to a state before the gain change of said variable gain.

21. A positioning adaptive control method for generating a control input for moving a head to a target position, the method comprising the steps of:
   adding a feedback control input based on a position error between a target position and a head position and a feed forward control input based on a target acceleration, wherein a variable gain is provided at an arbitrary place from the control input for the position signal of said head; and
   sequentially adjusting said variable gain for controlling said feed forward control input so that said position error is reduced by using said feedback control input and said feed forward control input to generate the control input even if said variable gain is increased or reduced during head movement to immediately reduce said position error which has been increased due to a gain change of said variable gain.

22. A positioning adaptive control method for generating a control input for moving a head to a target position, the method comprising the steps of:

adding a feedback control input based on a position error between a target position and a head position and a feed forward control input based on a target acceleration, wherein a variable gain is provided at an arbitrary place from the control input for the position signal of said head; and sequentially adjusting said variable gain for controlling said feed forward control input so that said position error is reduced by using said feedback control input and said feed forward control input to generate the control input even if said variable gain is increased or reduced in advance to immediately equalize the position signal of said head which has fluctuated due to a gain change of said variable gain to a state before the gain change of said variable gain.

23. A positioning adaptive control device of an information storage device, comprising:

a recording medium in which position data is recorded in advance;

a head arranged to read said position data;

a position signal computing element for generating a position signal from said position data reproduced by said head;

a speed signal computing element for generating a speed signal of said head based on said position signal;

a target acceleration generator for generating a target acceleration signal based on a remaining distance between a target position and a current position of said head;

a target speed generator for generating a target speed signal based on the remaining distance;

a speed error amplifier for generating a feedback control input signal by amplifying a speed error signal from a deviation between said target speed signal and said head speed signal; and a feed forward controller for generating a feed forward control input signal by multiplying said target acceleration signal with a controllable variable gain;

said head being moved to the target position by a control input signal obtained by adding said feedback control input signal and said feed forward control input signal; and an adaptive controller for sequentially adjusting said controllable variable gain for said target acceleration signal so that said speed error signal is minimized.

24. The positioning adaptive control device according to claim 23, wherein said adaptive controller sequentially controls the controllable variable gain for said target acceleration signal based on a value in which said speed error signal, said target acceleration signal and predetermined learning gain are multiplied so that a square of said speed error signal is minimized.

25. The positioning adaptive control device according to claim 23, wherein said adaptive controller sequentially adjusts the controllable variable gain for said target acceleration signal based on said speed error signal, said target acceleration signal and a predetermined learning gain so that a value in which squares of said speed error signal are added sequentially is minimized.

26. The positioning adaptive control device according to claim 23, wherein said sequential adjustment is carried out in synchronism with time intervals for reading the position data in a sector servo.

27. A positioning adaptive control device of an information storage device, comprising:

a recording medium in which position data is recorded in advance;

a head arranged to read said position data;

a position signal computing element for generating a position signal from the position data reproduced by said head;

a target acceleration generator for generating a target acceleration signal;

a position controller for generating a feedback control input signal by filtering a position error signal from a deviation between a target position signal and said position signal;

a feed forward controller for generating a feed forward control input signal by multiplying said target acceleration signal with a controllable variable gain;

said head being moved to the target position by a control input signal obtained by adding said feedback control input signal and said feed forward control input signal; and an adaptive controller for sequentially adjusting the controllable variable gain for said target acceleration signal so that said position error signal is minimized.

28. The positioning adaptive control device according to claim 27, wherein said adaptive controller sequentially adjusts the controllable variable gain for said target acceleration signal based on a value in which said position error signal, said target acceleration signal and a predetermined learning gain are multiplied so that a square of said position error signal is minimized.

29. The positioning adaptive control device according to claim 27, wherein said adaptive controller sequentially adjusts the controllable variable gain for said target, acceleration signal based on said position error signal, said target acceleration signal and a predetermined learning gain so that a sum of squares of said position error signal is minimized.

30. A positioning adaptive control device of an information storage device, comprising:

a recording medium in which position data is recorded in advance;

a head arranged to read said position data;

a position signal computing element for generating a position signal from said position data reproduced by said head;

a speed signal computing element for generating a speed signal of said head based on said position signal;

a target acceleration generator for generating a target acceleration signal based on a remaining distance between a target position and a current position of said head;

a target speed generator for generating a target speed signal based on said remaining distance;

a speed error amplifier for generating a feedback control input signal by amplifying a speed error signal from a deviation between said target speed signal and said head speed signal; and a feed forward controller for generating a first feed forward control input signal in which an acceleration disturbance signal is multiplied with a controllable first variable gain, a second feed forward control input signal in which said target acceleration signal is multiplied with a controllable second variable gain, and a feed forward control input signal obtained by adding said first feed forward control input signal and said second feed forward control input signal;

said head being moved to the target position by a control input signal obtained by adding said feedback control input signal and said feed forward control input signal; and an adaptive controller for sequentially adjusting the first variable gain of said acceleration disturbance signal and the second variable gain of said target acceleration signal so that said speed error signal is minimized.

31. A positioning adaptive control device of an information storage device, comprising:

a recording medium in which position data is recorded in advance;

a head arranged to read said position data;

a position signal computing element for generating a position signal from said position data reproduced by said head;

a target acceleration generator for generating a target acceleration signal;

a position controller for generating a feedback control input signal by filtering a position error signal from a deviation between a target position signal and said position signal;

a feed forward controller for generating a first feed forward control input signal in which an acceleration disturbance signal is multiplied with a controllable first variable gain, a second feed forward control input signal in which said target acceleration signal is multiplied with a controllable second variable gain, and a feed forward control input signal obtained by adding said first feed forward control input signal and said second feed forward control input signal;

said head being moved to the target position by a control input signal obtained by adding said feedback control input signal and said feed forward control input signal; and an adaptive controller for sequentially adjusting the first variable gain of said acceleration disturbance signal and the second variable gain of said target acceleration signal so that said position error signal is minimized.

32. In an information storage device having a recording medium in which position data is recorded, a head arranged to read said position data and a positioning adaptive control device for positioning said head to a track on said recording medium, the positioning adaptive control device comprising:

a position signal computing element for generating a position signal from said position data reproduced by said head;

a speed signal computing element for generating a speed signal of said head based on said position signal;

a target acceleration generator for generating a target acceleration signal based on a remaining distance between a target position and a current position of said head;

a target speed generator for generating a target speed signal based on the remaining distance;

a speed error amplifier for generating a feedback control input signal by amplifying a speed error signal from a deviation between said target speed signal and said head speed signal; and a feed forward controller for generating a feed forward control input signal by multiplying said target acceleration signal with a controllable variable gain;

said head being moved to the target position by a control input signal obtained by adding said feedback control input signal and said feed forward control input signal; and an adaptive controller for sequentially adjusting the variable gain of said controllable target acceleration signal so that said speed error signal is minimized.

33. A positioning adaptive control method for positioning a head to a target track on a disk during a seek operation, the method comprising the steps of:

adaptively controlling a feed forward loop having an input based on a target acceleration for the head to obtain a feed forward control input; and using said feed forward control input to position said head.

34. Apparatus for positioning a head to a target track on a disk during a seek operation using a feed forward control input, comprising:

an adaptive controller arranged in a feed forward loop having an input based on a target acceleration for the head, the adaptive controller outputting the feed forward control input;

a control unit coupled to the head receiving a control signal dependent on the feed forward control input to position the head.

* * * * *